(12) United States Patent
Ganiger et al.

(10) Patent No.: US 12,313,264 B2
(45) Date of Patent: May 27, 2025

(54) COUPLING ASSEMBLY FOR A TURBINE ENGINE

(71) Applicant: General Electric Company, Schenectady, NY (US)

(72) Inventors: Ravindra Shankar Ganiger, Bengaluru (IN); Hiranya Nath, Bengaluru (IN); Michael A. Benjamin, Cincinnati, OH (US); Daniel D. Brown, Cincinnati, OH (US); Sibtosh Pal, Mason, OH (US); Joseph Zelina, Waynesville, OH (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 18/314,565

(22) Filed: May 9, 2023

(65) Prior Publication Data

US 2024/0133556 A1  Apr. 25, 2024
US 2024/0230100 A9  Jul. 11, 2024

(30) Foreign Application Priority Data

Oct. 20, 2022  (IN) .............................. 202211060009

(51) Int. Cl.
*F23R 3/60* (2006.01)
*F23R 3/00* (2006.01)
(Continued)

(52) U.S. Cl.
CPC ................ *F23R 3/60* (2013.01); *F23R 3/002* (2013.01); *F02K 1/82* (2013.01); *F02K 1/822* (2013.01);
(Continued)

(58) Field of Classification Search
CPC .. F23R 3/60; F23R 3/002; F23R 3/007; F23R 2900/00017; F02K 1/82; F02K 1/822
See application file for complete search history.

(56) References Cited

U.S. PATENT DOCUMENTS 2,919,549 A   1/1960   Haworth et al.
3,741,592 A   6/1973   Muncy
(Continued)

OTHER PUBLICATIONS

Ganiger et al., U.S. Non-Provisional U.S. Appl. No. 17/809,629, filed Jun. 29, 2022 [Available in IFW].
(Continued)

*Primary Examiner* — Todd E Manahan
*Assistant Examiner* — Rene D Ford
(74) *Attorney, Agent, or Firm* — Venable LLP; Peter T. Hrubiec; Michele V. Frank

(57) ABSTRACT

A coupling assembly for a turbine engine. The coupling assembly includes a cold side component, a hot side component, and a fastening mechanism. The cold side component and the hot side component together at least partially form a combustion chamber. The fastening mechanism couples the hot side component to the cold side component. The fastening mechanism includes a stud disposed through the cold side component and a cap positioned on the stud. The cap defines a hollow interior and includes one or more first cap cooling holes. The one or more first cap cooling holes operably direct cooling air into the hollow interior such that the hollow interior provides a cushion of air between the combustion chamber and the stud.

20 Claims, 7 Drawing Sheets

(51) Int. Cl.
*F02K 1/82* (2006.01)
*F23R 3/06* (2006.01)

(52) U.S. Cl.
CPC .............. *F23R 3/007* (2013.01); *F23R 3/06* (2013.01); *F23R 2900/00017* (2013.01); *F23R 2900/03042* (2013.01)

(56) References Cited

U.S. PATENT DOCUMENTS

| | | | |
|---|---|---|---|
| 4,749,298 A * | 6/1988 | Bundt | F23R 3/60 |
| | | | 165/169 |
| 5,129,447 A * | 7/1992 | Hamner | F24F 5/0089 |
| | | | 165/47 |
| 6,910,671 B1 | 6/2005 | Norkus et al. | |
| 7,682,117 B2 | 3/2010 | Holt et al. | |
| 8,191,224 B2 | 6/2012 | Richards | |
| 9,587,664 B2 | 3/2017 | Bisset et al. | |
| 9,683,743 B2 * | 6/2017 | Clemen | F23M 5/04 |
| 10,533,747 B2 * | 1/2020 | Corsmeier | F02C 7/32 |
| 10,808,930 B2 | 10/2020 | Schlichting | |
| 10,837,646 B2 * | 11/2020 | Clemen | F23R 3/002 |
| 10,935,244 B2 | 3/2021 | Kostka et al. | |
| 10,969,103 B2 | 4/2021 | Chang et al. | |
| 2007/0009342 A1 | 1/2007 | Figge et al. | |
| 2011/0048024 A1 * | 3/2011 | Snyder | F23R 3/50 |
| | | | 60/754 |
| 2015/0260400 A1 * | 9/2015 | Clemen | F23R 3/60 |
| | | | 60/722 |
| 2016/0186997 A1 | 6/2016 | Sadil et al. | |
| 2017/0205069 A1 * | 7/2017 | Tentorio | F23R 3/005 |
| 2019/0093893 A1 | 3/2019 | Clemen et al. | |

OTHER PUBLICATIONS

Final Report on Incident to M/S/ Indigo Airlines Airbus A320 Aircraft VT-ITF AT Mumbai on Jan. 21, 2017, Jan. 3, 2019, 39 pages.

* cited by examiner

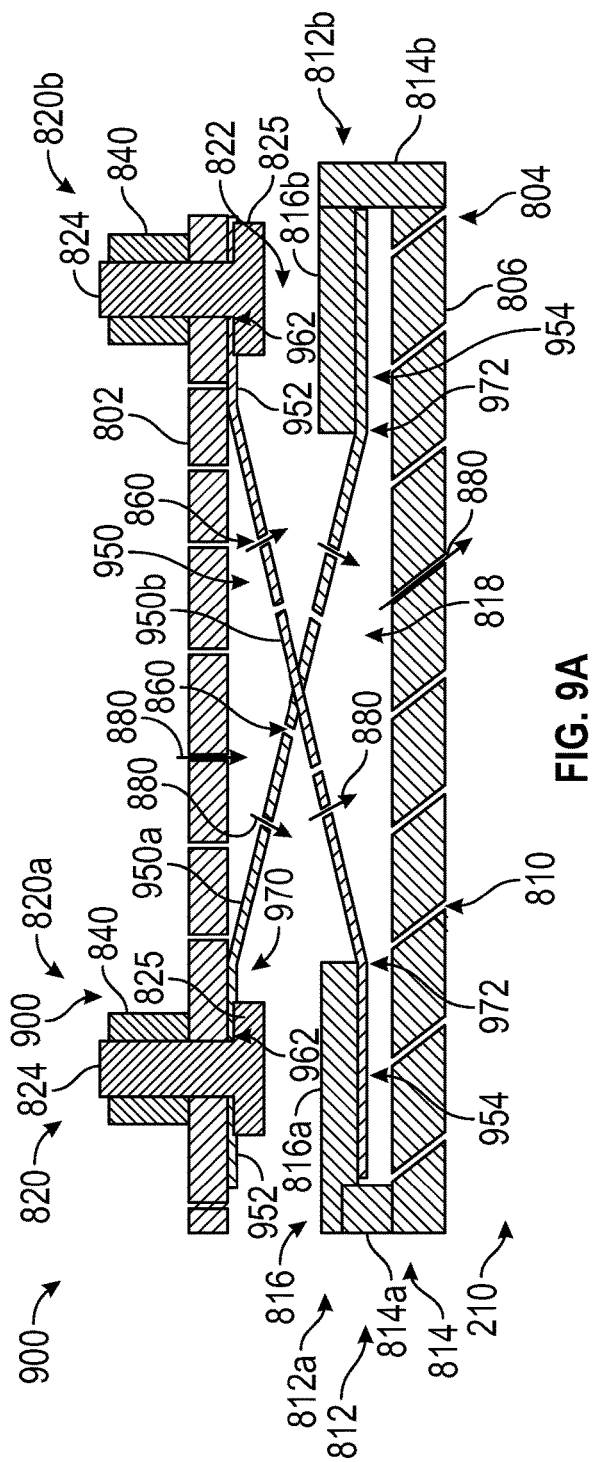
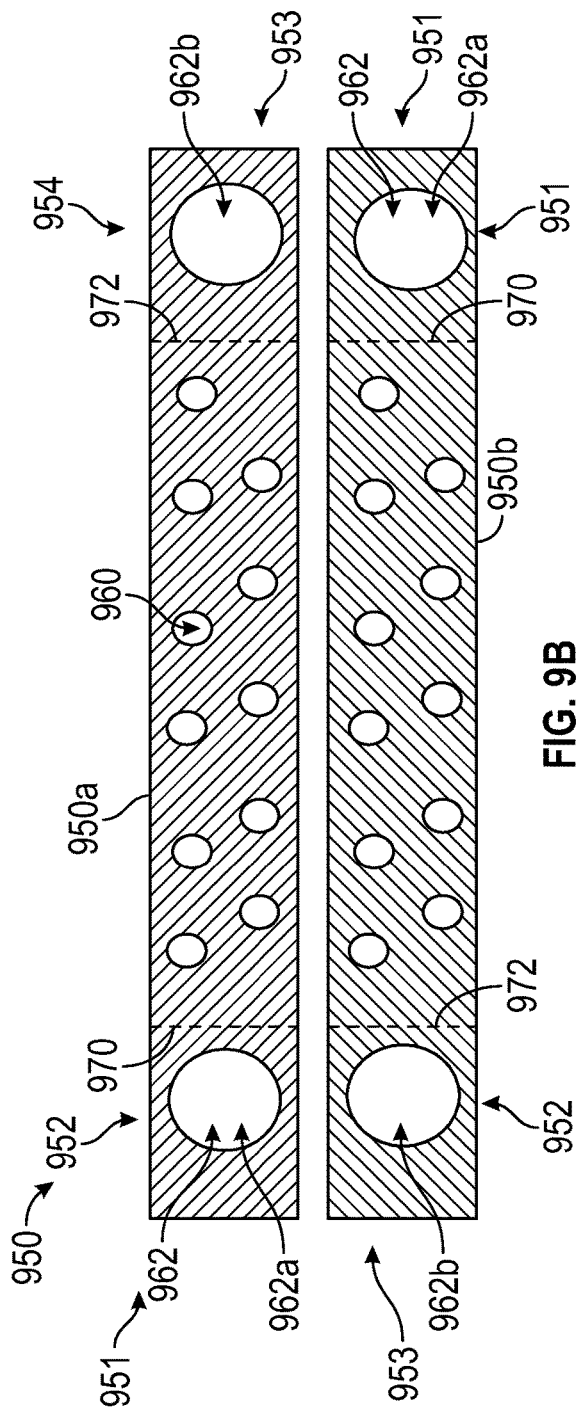
FIG. 9A
FIG. 9B

COUPLING ASSEMBLY FOR A TURBINE ENGINE

CROSS REFERENCE TO RELATED APPLICATIONS

The present application claims the benefit of Indian Patent Application No. 202211060009, filed on Oct. 20, 2022, which is hereby incorporated by reference herein in its entirety.

TECHNICAL FIELD

The present disclosure relates generally to coupling assemblies for turbine engines.

BACKGROUND

A turbine engine may include a combustion section having a combustor that generates hot combustion gases discharged into a turbine section of the turbine engine. The combustion section may include a cold side component and a hot side component that are coupled together by a coupling assembly.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

FIG. 9A is a schematic partial cross-sectional view of a portion of a coupling assembly for the combustion section of the turbine engine of FIG. 1, taken at a centerline axis of the turbine engine, according to another embodiment.

FIG. 9B is a top view of a plurality of flexible plates isolated from the coupling assembly of FIG. 9A, according to another embodiments.

DETAILED DESCRIPTION

Figure 1:
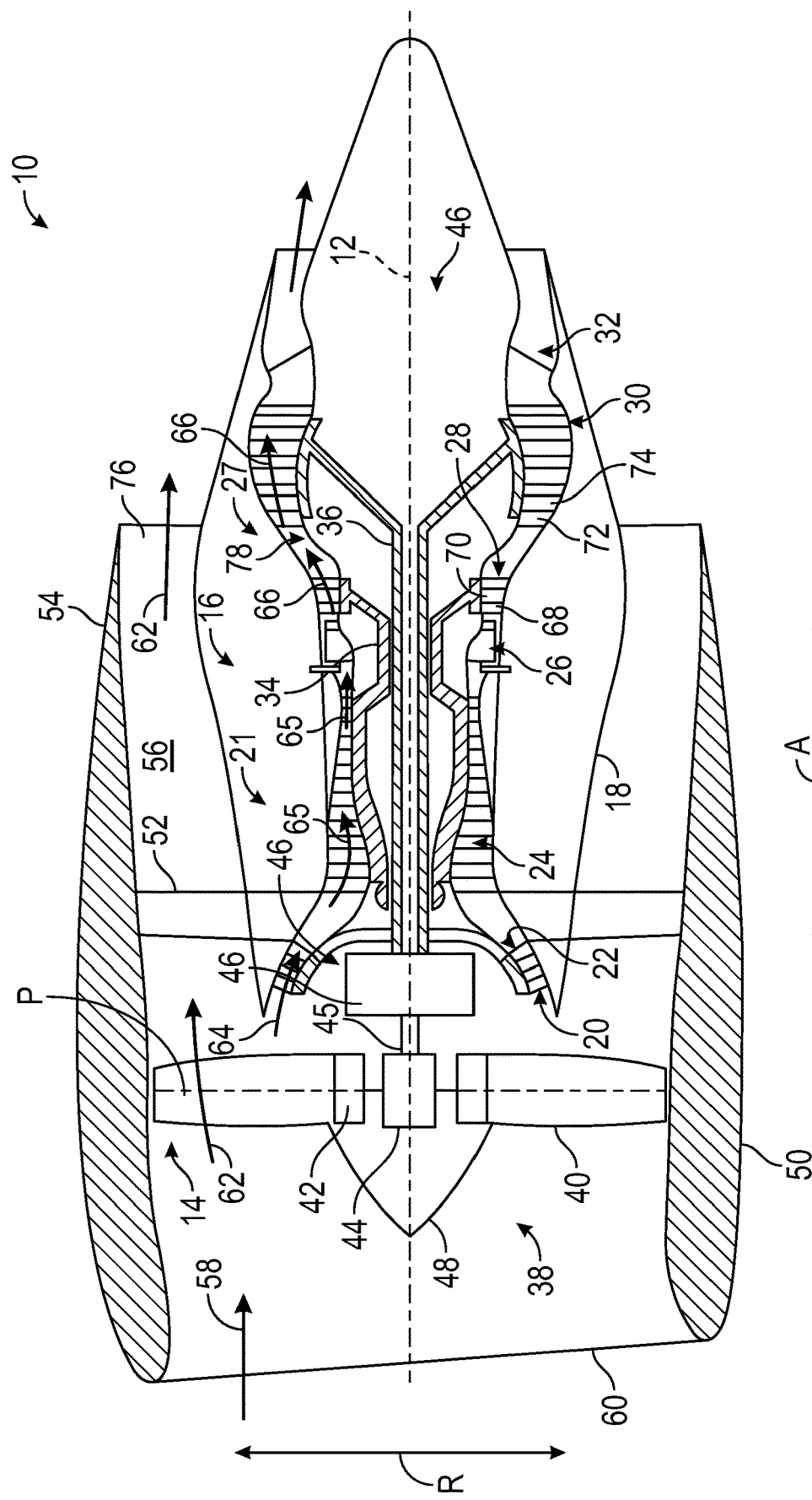
FIG. 1 is a schematic cross-sectional diagram of a turbine engine, taken along a centerline axis of the turbine engine, according to the present disclosure.

Additional features, advantages, and embodiments of the present disclosure are set forth or apparent from a consideration of the following detailed description, drawings, and claims. Moreover, both the foregoing summary of the present disclosure and the following detailed description are exemplary and intended to provide further explanation without limiting the scope of the disclosure as claimed.

Various embodiments of the present disclosure are discussed in detail below. While specific embodiments are discussed, this is done for illustration purposes only. A person skilled in the relevant art will recognize that other components and configurations may be used without departing from the spirit and the scope of the present disclosure.

As used herein, the terms "first," "second," "third," and "fourth" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "forward" and "aft" refer to relative positions within a turbine engine or vehicle, and refer to the normal operational attitude of the turbine engine or vehicle. For example, with regard to a turbine engine, forward refers to a position closer to an engine inlet and aft refers to a position closer to an engine nozzle or exhaust.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

As used herein, a "hot side" is a side of a combustion section of the turbine engine that is exposed to, or is otherwise oriented to face, a combustion chamber of the combustion section.

As used herein, a "cold side" is a side of the combustion section of the turbine engine that is not exposed to, or otherwise not oriented to face, the combustion chamber.

The present disclosure provides for a coupling assembly for a combustion section of a turbine engine. The combustion section includes a cold side component and a hot side component coupled to the cold side component. The cold side component and the hot side component can be components of a liner and/or of an annular dome assembly of the combustion section. For example, the cold side component can be a shell of the liner and the hot side component can be a heat shield including tiles or panels coupled to the shell. In some embodiments, the cold side component is an annular dome assembly and the hot side component is a deflector assembly including tiles or panels coupled to the annular dome assembly. The hot side component protects or shields the cold side component from hot combustion gases inside a combustion chamber of the combustion section. The coupling assembly includes one or more fastening mechanisms positioned about the cold side component to fasten and to secure the hot side component to the hot side component.

When the cold side component and the hot side component are assembled, the one or more fastening mechanisms may be exposed to the hot combustion gases. For example, the one or more fastening mechanisms can include studs that are an integral part of the panels, and the studs may experience distress due to lack of adequate cooling. Accordingly, current combustion sections may experience thermal distress around the fastening mechanisms due to the proximity of the fastening mechanisms to the hot combustion gases and a lack of adequate cooling about the fastening mechanisms. In some instances, the thermal distress around the fastening mechanisms may cause fatigue, failure, or wear to a portion of the combustion section about the fastening mechanisms. Thus, embodiments of the present disclosure provide for an improved coupling assembly and cooling arrangement about the fastening mechanisms of the combustion section to improve the durability and the life cycle of such combustion sections as compared to combustion sections without the benefit of the present disclosure.

The present disclosure provides for avoiding direct exposure of hot combustion gases to the studs by providing a hollow stud and/or a hollow cap positioned on the stud. Cooling air is directed through the hollow stud and/or through the hollow cap. The present disclosure provides for various arrangements of coupling the hollow cap to the stud. The present disclosure also provides for avoiding hot combustion gas exposure by shifting the location of the head of the stud from the hot side of the panels to the shell. Embodiments of the present disclosure also include plates for retaining the panels on the cold side component without the use of rigid bolting. The plates can include a multi-finger or a projection engagement with the panels to hold the panels to the cold side component without the fastening mechanisms having to contact the panels directly. The plates can be made from a ceramic matrix composite or from a metal. Cooling air is directed through the plates. Thus, the present disclosure provides for reducing the thermal gradients and preventing stress concentration in the areas about the fastening mechanisms by facilitating cooling to the panels through the cap and/or through the plates, as compared to coupling assemblies without the benefit of the present disclosure.

Referring now to the drawings, FIG. 1 is a schematic cross-sectional diagram of a turbine engine 10, taken along a centerline axis of the turbine engine 10, according to an embodiment of the present disclosure. As shown in FIG. 1, the turbine engine 10 defines an axial direction A (extending parallel to a longitudinal, centerline axis 12 provided for reference) and a radial direction R that is normal to the axial direction A. In general, the turbine engine 10 includes a fan section 14 and a core turbine engine 16 disposed downstream from the fan section 14.

The core turbine engine 16 depicted generally includes an outer casing 18 that is substantially tubular and defines an annular inlet 20. As schematically shown in FIG. 1, the outer casing 18 encases, in serial flow relationship, a compressor section 21 including a booster or a low pressure (LP) compressor 22 followed downstream by a high pressure (HP) compressor 24, a combustion section 26, a turbine section 27 including a high pressure (HP) turbine 28 followed downstream by a low pressure (LP) turbine 30, and a jet exhaust nozzle section 32. A high pressure (HP) shaft 34 or spool drivingly connects the HP turbine 28 to the HP compressor 24 to rotate the HP turbine 28 and the HP compressor 24 in unison. A low pressure (LP) shaft 36 drivingly connects the LP turbine 30 to the LP compressor 22 to rotate the LP turbine 30 and the LP compressor 22 in unison. The compressor section 21, the combustion section 26, the turbine section 27, and the jet exhaust nozzle section 32 together define a core air flowpath.

For the embodiment depicted in FIG. 1, the fan section 14 includes a fan 38 (e.g., a variable pitch fan) having a plurality of fan blades 40 coupled to a disk 42 in a spaced apart manner. As depicted in FIG. 1, the fan blades 40 extend outwardly from the disk 42 generally along the radial direction R. Each fan blade 40 is rotatable relative to the disk 42 about a pitch axis P by virtue of the fan blades 40 being operatively coupled to an actuation member 44 configured to collectively vary the pitch of the fan blades 40 in unison. The fan blades 40, the disk 42, and the actuation member 44 are together rotatable about the centerline axis 12 via a fan shaft 45 that is powered by the LP shaft 36 across a power gearbox, also referred to as a gearbox assembly 46. The gearbox assembly 46 is shown schematically in FIG. 1. The gearbox assembly 46 includes a plurality of gears for adjusting the rotational speed of the fan shaft 45 and, thus, the fan 38 relative to the LP shaft 36.

Referring still to the exemplary embodiment of FIG. 1, the disk 42 is covered by a rotatable fan hub 48 aerodynamically contoured to promote an airflow through the plurality of fan blades 40. In addition, the fan section 14 includes an annular fan casing or a nacelle 50 that circumferentially surrounds the fan 38 and/or at least a portion of the core turbine engine 16. The nacelle 50 is supported relative to the core turbine engine 16 by a plurality of circumferentially spaced outlet guide vanes 52. Moreover, a downstream section 54 of the nacelle 50 extends over an outer portion of the core turbine engine 16 to define a bypass airflow passage 56 therebetween.

During operation of the turbine engine 10, a volume of air 58 enters the turbine engine 10 through an inlet 60 of the nacelle 50 and/or the fan section 14. As the volume of air 58 passes across the fan blades 40, a first portion of air 62 is directed or routed into the bypass airflow passage 56, and a second portion of air 64 is directed or is routed into the upstream section of the core air flowpath, or, more specifically, into the annular inlet 20 of the LP compressor 22. The ratio between the first portion of air 62 and the second portion of air 64 is commonly known as a bypass ratio. The pressure of the second portion of air 64 is then increased, forming compressed air 65, and the compressed air 65 is routed through the HP compressor 24 and into the combustion section 26, where the compressed air 65 is mixed with fuel and burned to provide combustion gases 66.

The combustion gases 66 are routed into the HP turbine 28 and expanded through the HP turbine 28 where a portion of thermal and/or of kinetic energy from the combustion gases 66 is extracted via sequential stages of HP turbine stator vanes 68 that are coupled to the outer casing 18 and HP turbine rotor blades 70 that are coupled to the HP shaft 34, thus, causing the HP shaft 34 to rotate, thereby supporting operation of the HP compressor 24. The combustion gases 66 are then routed into the LP turbine 30 and expanded through the LP turbine 30. Here, a second portion of thermal and kinetic energy is extracted from the combustion gases 66 via sequential stages of LP turbine stator vanes 72 that are coupled to the outer casing 18 and LP turbine rotor blades 74 that are coupled to the LP shaft 36, thus, causing the LP shaft 36 to rotate, thereby supporting operation of the LP compressor 22 and rotation of the fan 38 via the gearbox assembly 46.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before being exhausted from a fan nozzle exhaust section 76 of the turbine engine 10, also providing propulsive thrust. The HP turbine 28, the LP turbine 30, and the jet exhaust nozzle section 32 at least partially define a hot gas path 78 for routing the combustion gases 66 through the core turbine engine 16.

The turbine engine 10 depicted in FIG. 1 is by way of example only. In other exemplary embodiments, the turbine engine 10 may have any other suitable configuration. For example, in other exemplary embodiments, the fan 38 may be configured in any other suitable manner (e.g., as a fixed pitch fan) and further may be supported using any other suitable fan frame configuration. Moreover, in other exemplary embodiments, any other suitable number or configuration of compressors, turbines, shafts, or a combination thereof may be provided. In still other exemplary embodiments, aspects of the present disclosure may be incorporated into any other suitable turbine engine, such as, for example, turbofan engines, propfan engines, turbojet engines, turboprop, and/or turboshaft engines.

Figure 2:
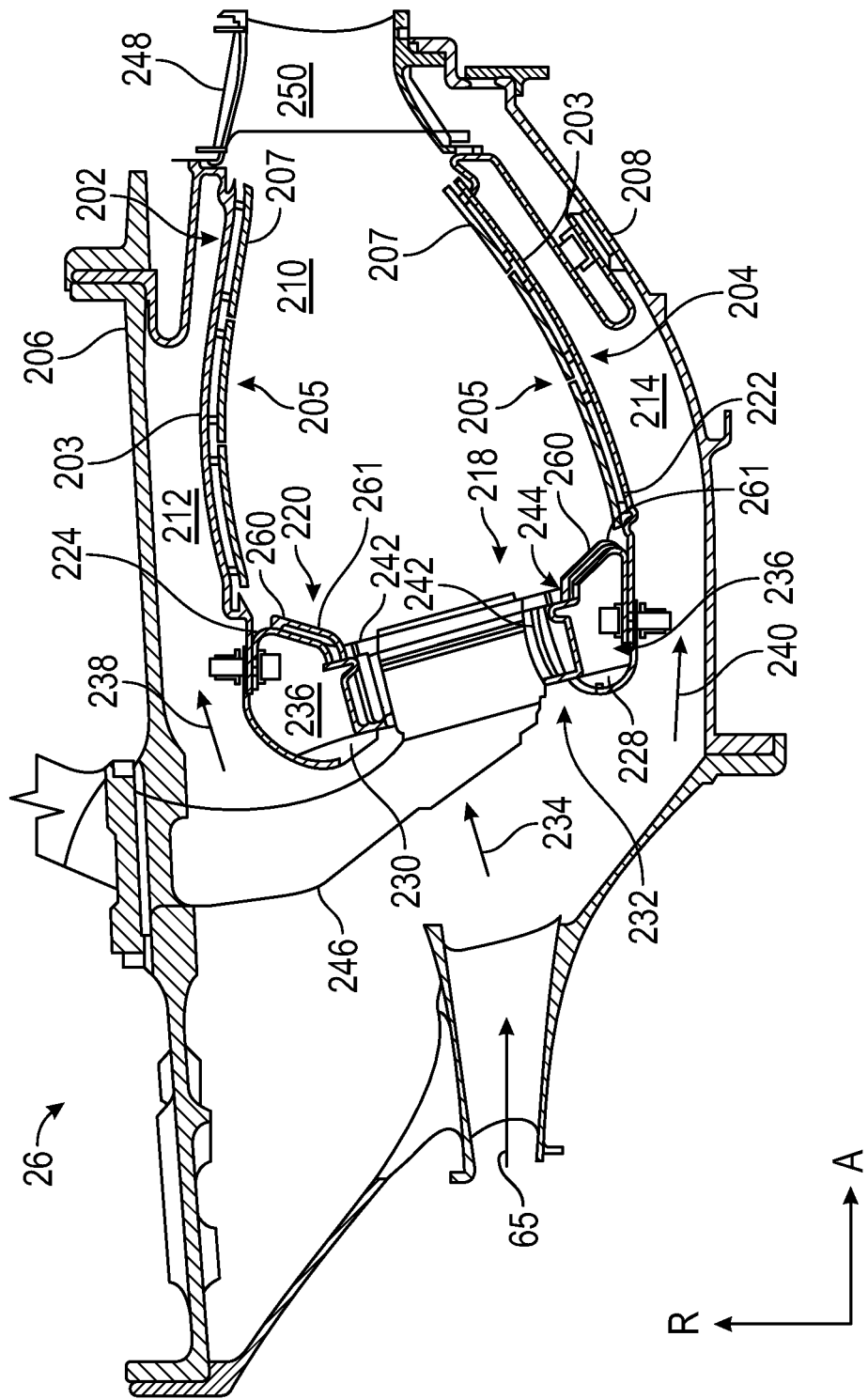
FIG. 2 is a schematic partial cross-sectional view of a portion of an exemplary combustion section of the turbine engine of FIG. 1, according to the present disclosure.

FIG. 2 is a schematic partial cross-sectional view of a portion of an exemplary combustion section 26 of the turbine engine 10 (FIG. 1), according to the present disclosure. Various embodiments of the combustion section 26 may further define a rich burn combustor in particular. Other embodiments may, however, define a lean burn combustor configuration. In the exemplary embodiment, the combustion section 26 includes an annular combustor. One skilled in the art will appreciate that the combustor may be any other combustor, including, but not limited to, a single or a double annular combustor, a can-combustor, or a can-annular combustor.

FIG. 2 shows the combustion section 26 defines an axial direction A and a radial direction R that is normal to the axial direction A. The combustion section 26 includes an outer liner 202 and an inner liner 204 disposed between an outer combustor casing 206 and an inner combustor casing 208. The outer liner 202 and the inner liner 204 are spaced radially from each other such that a combustion chamber 210 is defined therebetween. The outer liner 202 and the outer combustor casing 206 form an outer passage 212 therebetween, and the inner liner 204 and the inner combustor casing 208 form an inner passage 214 therebetween. The outer liner 202 and the inner liner 204 each includes a shell 203 and a heat shield 205. In the exemplary embodiments, the outer liner 202 and the inner liner 204 (e.g., the shell 203 and heat shield 205) are generally cylindrical, but may take any known shape of a liner for a combustor.

The heat shield 205 includes one or more tiles or panels 207 arranged on and coupled to a hot side of the shell 203. That is, the panels 207 of the heat shield 205 are coupled on a side of the shell 203 directly exposed to the combustion chamber 210. FIG. 2 depicts three panels 207 of the heat shield 205, but the heat shield 205 may include any number of panels 207, as desired. The shell 203 is made of, for example, non-ceramic materials, such as metals or the like. The panels 207 of the heat shield 205 are made of, for example, a ceramic material. In some embodiments, the panels 207 are ceramic matrix composites (CMC). Thus, the heat shield 205 provides a shield for the shell 203, enhancing the life of the shell 203, thereby enhancing the life of the outer liner 202 and of the inner liner 204.

The combustion section 26 may also include a combustor assembly 218 comprising an annular dome assembly 220 mounted upstream of the combustion chamber 210. The combustor assembly 218 is configured to be coupled to the forward ends of the outer liner 202 and the inner liner 204. More particularly, the combustor assembly 218 includes an inner annular dome 222 attached to the forward end of the inner liner 204 and an outer annular dome 224 attached to the forward end of the outer liner 202.

The combustion section 26 may be configured to receive the compressed air 65 from a discharge outlet of the HP compressor 24 (FIG. 1) of the turbine engine 10 (FIG. 1). To assist in directing the compressed air 65, the annular dome assembly 220 may further comprise an inner cowl 228 and an outer cowl 230 that may be coupled to the upstream ends of the inner liner 204 and the outer liner 202, respectively. In this regard, an annular opening 232 formed between the inner cowl 228 and the outer cowl 230 enables compressed fluid (e.g., the compressed air 65) to enter the combustion section 26 through a diffuser opening in a direction generally indicated by flow direction 234. The compressed air 65 may enter into a cavity 236 defined at least in part by the annular dome assembly 220. In various embodiments, the cavity 236 is more specifically defined between the inner annular dome 222 and the outer annular dome 224, and the inner cowl 228 and the outer cowl 230. As will be discussed in more detail below, a portion of the compressed air 65 in the cavity 236 may be used for combustion, while another portion may be used for cooling the combustion section 26.

In addition to directing air into the cavity 236 and the combustion chamber 210, the inner cowl 228 and the outer cowl 230 may direct a portion of the compressed air 65 around the outside of the combustion chamber 210 to facilitate cooling the outer liner 202 and the inner liner 204. For example, as shown in FIG. 2 a portion of the compressed air 65 may flow around the combustion chamber 210, as indicated by an outer passage flow direction 238 and an inner passage flow direction 240, to provide cooling air to the outer passage 212 and the inner passage 214, respectively.

In certain exemplary embodiments, the inner annular dome 222 may be formed integrally as a single annular component, and, similarly, the outer annular dome 224 may also be formed integrally as a single annular component. In still certain embodiments, the inner annular dome 222 and the outer annular dome 224 may together be formed as a single integral component. In still various embodiments, the annular dome assembly 220, including one or more of the inner annular dome 222, the outer annular dome 224, the outer liner 202, or the inner liner 204, may be formed as a single integral component. In other exemplary embodiments, the inner annular dome 222 or the outer annular dome 224 may alternatively be formed by one or more components joined in any suitable manner. For example, with reference to the outer annular dome 224, in certain exemplary embodiments, the outer cowl 230 may be formed separately from the outer annular dome 224 and attached to the forward end of the outer annular dome 224 using, e.g., a welding process, a mechanical fastener, a bonding process or adhesive, or a composite layup process. Additionally, or alternatively, the inner annular dome 222 may have a similar configuration.

The combustor assembly 218 further includes a plurality of mixer assemblies 242 spaced along a circumferential direction between the outer annular dome 224 and the inner annular dome 222. In this regard, the annular dome assembly 220 defines an opening in which a swirler, a cyclone, or a mixer assembly 242 is mounted, attached, or otherwise integrated for introducing the air/fuel mixture into the combustion chamber 210. Notably, the compressed air 65 is directed from the combustion section 26 into or through one or more of the mixer assemblies 242 to support combustion in the upstream end of the combustion chamber 210.

A liquid or a gaseous fuel is transported to the combustion section 26 by a fuel distribution system (not shown), where it is introduced at the front end of a burner in a highly atomized spray from a fuel nozzle. In an exemplary embodiment, each mixer assembly 242 defines an opening for receiving a fuel injector 246 (details are omitted for clarity). The fuel injector 246 injects fuel in a generally axial direction A, as well as in a generally radial direction R, where the fuel is swirled with the incoming compressed air 65. Thus, each mixer assembly 242 receives compressed air 65 from the annular opening 232 and fuel from a corresponding fuel injector 246. Fuel and pressurized air are swirled and mixed together by the mixer assemblies 242, and the resulting fuel/air mixture is discharged into combustion chamber 210 for combustion thereof. The mixer assemblies 242 and the fuel injectors 246 may include any type of mixer assembly and fuel injector, respectively, as desired.

The combustion section 26 may further comprise an ignition assembly (e.g., one or more igniters extending through the outer liner 202) suitable for igniting the fuel-air mixture. Details of the fuel injectors and the ignition assembly are omitted in FIG. 2 for clarity. Upon ignition, the resulting hot combustion gases may flow in a generally axial direction A through the combustion chamber 210 into and through the turbine section 27 (FIG. 1) of the turbine engine 10 (FIG. 1) where a portion of the thermal energy or the kinetic energy from the combustion gases 66 is extracted, as detailed above. More specifically, the combustion gases 66 may flow into an annular, first stage turbine nozzle 248. As is generally understood, the first stage turbine nozzle 248 is defined by an annular flow channel that includes a plurality of radially extending, circularly spaced nozzle vanes 250 that turn the gases so that they flow angularly and impinge upon the HP turbine rotor blades 70 (FIG. 1) of the HP turbine 28 (FIG. 1).

Each dome (e.g., the inner annular dome 222 and the outer annular dome 224) has a heat shield, for example, a deflector assembly 260, which thermally insulates the annular dome assembly 220 from the extremely high temperatures generated in the combustion chamber 210 during engine operation (e.g., from the combustion gases 66). The inner annular dome 222, the outer annular dome 224, and the deflector assembly 260 may define a plurality of openings 244 for receiving the mixer assemblies 242. As shown, the plurality of openings 244 are, in one embodiment, circular. In other embodiments, the plurality of openings 244 are ovular, elliptical, polygonal, oblong, or other non-circular cross sections. The deflector assembly 260 is mounted on a combustion chamber side (e.g., a hot side) of the annular dome assembly 220.

The deflector assembly 260 includes one or more tiles or panels 261 arranged on and coupled to a hot side of the annular dome assembly 220. That is, the panels 261 of the deflector assembly 260 are coupled on a side of the annular dome assembly 220 directly exposed to the combustion chamber 210. FIG. 2 depicts two panels 261 of the deflector assembly 260, but the deflector assembly 260 may include any number of panels 261, as desired. The panels 261 of the deflector assembly 260 are made of, for example, a ceramic material. In some embodiments, the panels 261 are ceramic matrix composites (CMC). Thus, the deflector assembly 260 provides a shield for the annular dome assembly 220, thereby enhancing the life of the annular dome assembly 220.

FIGS. 3 to 9B depict various embodiments of a coupling assembly for a combustion section 26 (FIGS. 1 and 2) of a turbine engine 10 (FIG. 1), taken at a centerline axis of the turbine engine 10 (FIG. 1). The coupling assemblies of FIGS. 3 to 9B can be used for the outer liner 202 (FIG. 2), the inner liner 204 (FIG. 2), the annular dome assembly 220 (FIG. 2), and/or any other component of the combustion section 26 or of the turbine engine 10. Each of the coupling assemblies detailed herein includes coupling a hot side component to a cold side component. As used herein, the "hot side" is a side of the combustion section 26 (FIG. 2) that is exposed to, or is otherwise oriented to face, the combustion chamber 210, and the "cold side" is a side of the combustion section 26 (FIG. 2) that is not exposed to, or is not otherwise oriented to face, the combustion chamber 210. In the exemplary embodiments, the cold side component is the shell 203 (FIG. 2) of the outer liner 202 (FIG. 2) or of the inner liner 204 (FIG. 2), and the hot side component is the heat shield 205 (FIG. 2). In some embodiments, the cold side component is the inner annular dome 222 (FIG. 2) and/or the outer annular dome 224 (FIG. 2), and the hot side component is the deflector assembly 260 (FIG. 2). FIGS. 3 to 9B include many of the same or similar components and functionality. Similar reference numerals denote similar features and functionality between the figures, unless noted otherwise. The embodiments of FIGS. 3 to 9B are detailed further below.

Figure 3:
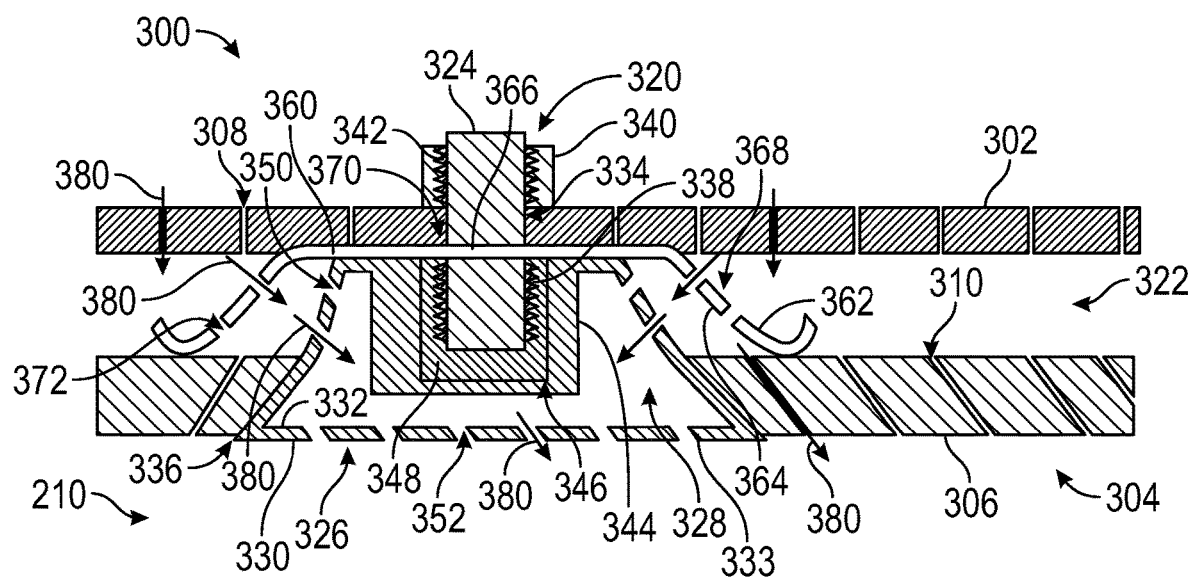
FIG. 3 is a schematic partial cross-sectional view of a portion of a coupling assembly for the combustion section of the turbine engine of FIG. 1, taken at a centerline axis of the turbine engine, according to the present disclosure.

FIG. 3 is a schematic partial cross-sectional view of a portion of a coupling assembly 300 for a combustion section (FIGS. 1 and 2) of a turbine engine 10 (FIG. 1), taken at a centerline axis of the turbine engine 10 (FIG. 1), according to the present disclosure. FIG. 3 shows the coupling assembly 300 includes a cold side component 302 and a hot side component 304. The hot side component 304 includes one or more tiles or panels 306 arranged on and coupled to a hot side of the cold side component 302. That is, the panels 306 of the hot side component 304 are coupled on a side of the cold side component 302 exposed to the combustion chamber 210. One panel 306 is depicted in FIG. 3, but the hot side component 304 may include any number of panels 306, as desired.

The cold side component 302 includes one or more cold side component cooling holes 308 and the hot side component 304 includes one or more hot side component cooling holes 310. In this way, cooling air 380 (e.g., the compressed air 65 in FIG. 2) can pass through the cold side component 302 and can pass through the hot side component 304, as detailed further below. The one or more cold side component cooling holes 308 are impingement cooling holes that are disposed generally radially through the cold side component 302. The one or more hot side component cooling holes 310 are film cooling holes that are disposed through the hot side component 304 at an angle. The one or more cold side component cooling holes 308 and the one or more hot side component cooling holes 310 may include any number of cooling holes formed in any orientation with respect to the cold side component 302 and the hot side component 304, respectively. In some embodiments, the one or more cold side component cooling holes 308 and the one or more hot side component cooling holes 310 are also angled circumferentially to operably direct cooling air tangentially.

The coupling assembly 300 includes one or more fastening mechanisms 320 for attaching and connecting the cold side component 302 and the hot side component 304 (e.g., each of the panels 306 of the hot side component 304). That is, the hot side component 304 is coupled by the one or more fastening mechanisms 320 to the cold side component 302. While FIG. 3 shows one fastening mechanism 320, the one or more fastening mechanisms 320 may include any number of fastening mechanisms, as desired. A gap or a space 322 is formed between the cold side component 302 and the hot side component 304. For example, the space 322 is formed between a radially outer surface of hot side component 304 and a radially inner surface of the cold side component 302.

The one or more fastening mechanisms 320 include a stud 324 and a cap 326. The one or more fastening mechanisms 320 may include any type of known fastening mechanism such as, for example, bolts, screws, nuts, rivets, or the like. The stud 324 includes a generally cylindrical body that defines the stud 324. The cap 326 includes a generally frustoconical shape with a hollow interior 328 such that the cap 326 includes an exterior surface 330 and an interior surface 332. The exterior surface 330 and the interior surface 332 together form a thin wall 333 such that the hollow interior 328 includes a shape that generally corresponds to a shape of the cap 326. In this way, the hollow interior 328 is an enclosed hollow interior 328. Accordingly, the hollow interior 328 defines a reservoir that is filled with cooling air during operation of the turbine engine 10 (FIG. 1), as detailed further below. The stud 324 and the cap 326 may include any shape and/or any size, as desired. The cap 326 and the hollow interior 328 each include a diameter larger than an outer diameter of the stud 324. The stud 324 is inserted through a first fastening mechanism aperture 334 of the cold side component 302 and the cap 326 is coupled to the stud 324. When the cap 326 is coupled to the stud 324, the cap 326 is inserted and is disposed in a second fastening mechanism aperture 336 of the hot side component 304. In this way, the cap 326 seals the second fastening mechanism aperture 336 such that the hot combustion gases in the combustion chamber 210 do not leak through the second fastening mechanism aperture 336. The cap 326 is positioned between the stud 324 and the combustion chamber 210 such that the stud 324 is insulated from the combustion chamber 210. In this way, the stud 324 is not directly exposed to the combustion chamber 210. For example, the stud 324 is spaced radially from the combustion chamber 210.

The cap 326 is coupled to the stud 324 by a first threaded connection 338. In some embodiments, the cap 326 is press fit onto the stud 324 without the use of a threaded connection. In some embodiments, the cap 326 is formed integral with the stud 324 such that the cap 326 and the stud 324 form a single, unitary component. The one or more fastening mechanisms 320 also include a nut 340 that is coupled to the stud 324 on a cold side of the stud 324. The nut 340 is coupled to the stud 324 by a second threaded connection 342. In some examples, the nut 340 is press fit to the stud 324. As the nut 340 is tightened, the second threaded connection 342 pulls the stud 324 and the cap 326 through the second fastening mechanism aperture 336 such that the fastening mechanism 320 is tightened and secured to securely couple the hot side component 304 to the cold side component 302.

The cap 326 includes a stud receiving portion 344 that defines a stud opening 346 for receiving a portion of the stud 324. The stud receiving portion 344 and the stud opening 346 are sized and are shaped to receive the stud 324. FIG. 3 shows the stud receiving portion 344 includes a solid, annular body about the stud 324. In some embodiments, the cap 326 can define a radial gap or a radial space about the stud receiving portion 344 for additional cooling, as detailed further below with respect to FIG. 5. The stud receiving portion 344 extends from a cold side of the interior surface 332 and into the hollow interior 328 of the cap 326. The stud receiving portion 344 is spaced from the hot side of the interior surface 332. In this way, the hollow interior 328 surrounds the stud receiving portion 344.

The cap 326 can include a cap insert 348 that is threaded onto the stud 324 at the first threaded connection 338. The stud opening 346 is sized and is shaped to receive the cap insert 348 in order to couple the cap 326 to the stud 324. For example, the cap 326 is press fit onto the cap insert 348. In some embodiments, the cap insert 348 is formed integrally with the cap 326 such that the cap insert 348 and the cap 326 form a single, unitary component. In some embodiments, the cap insert 348 is welded, brazed, or otherwise attached to the cap 326 and/or to the stud 324. In some embodiments, the cap insert 348 is press fit onto the stud 324. In some embodiments, the cap insert 348, the cap 326, and the stud 324 are formed integrally together such that the cap insert 348, the cap 326, and the stud 324 form a single, unitary component. In some embodiments, the cap 326 is directly coupled to the stud 324 without the use of a cap insert. For example, the stud receiving portion 344 and the stud opening 346 of the cap 326 can be sized and shaped to directly receive the stud 324. In some embodiments, the stud receiving portion 344 includes threads such that the cap 326 is threaded to couple the cap 326 to the stud 324 at the first threaded connection 338 by the threads of the stud receiving portion 344.

The cap 326 includes one or more first cap cooling holes 350 extending therethrough, and one or more second cap cooling holes 352 extending therethrough. The one or more first cap cooling holes 350 and the one or more second cap cooling holes 352 each extends through the thin wall 333 from the exterior surface 330 to the interior surface 332 of the cap 326. The one or more first cap cooling holes 350 are disposed in the space 322 when the one or more fastening mechanisms 320 are secured. In this way, the one or more first cap cooling holes 350 provide fluid communication from the space 322 to the hollow interior 328 of the cap 326. The one or more second cap cooling holes 352 are disposed at a hot side of the cap 326. In this way, the one or more second cap cooling holes 352 provide fluid communication from the hollow interior 328 of the cap 326 to the combustion chamber 210. In some embodiments, the one or more first cap cooling holes 350 and/or the one or more second cap cooling holes 352 are angled circumferentially to operably direct cooling air tangentially to the hollow interior 328 or to the combustion chamber 210, respectively.

The coupling assembly 300 also includes a washer 360 that is disposed in the space 322 between the cold side component 302 and the hot side component 304. The washer 360 includes a first washer surface 362 and a second washer surface 364 opposite the first washer surface 362. The washer 360 includes a flexible washer such that the washer 360 can bend or otherwise can flex with movement of the cold side component 302 and/or of the hot side component 304. The washer 360 includes a flat portion 366 and a bend portion 368. The flat portion 366 includes a generally straight, flat portion of the washer 360. The bend portion 368 includes one or more bends and defines a generally frusto-conical shape that surrounds the portion of the cap 326 within the space 322.

When the coupling assembly 300 is assembled, a cold side of the exterior surface 330 of the cap 326 contacts the second washer surface 364 at the flat portion 366 of the washer 360 such that the washer 360 is disposed and secured between the cold side component 302 and the cap 326. The bend portion 368 is bent from the flat portion 366 such that the bend portion 368 extends to the cold side of the hot side component 304. In this way, the first washer surface 362 contacts the cold side component 302 and the second washer surface 364 contacts the cap 326 (e.g., at the flat portion 366) and contacts the hot side component 304 (e.g., at the bend portion 368). Thus, the washer 360 maintains the space 322 between the cold side component 302 and the hot side component 304 such that the washer 360 prevents the hot side component 304 from contacting the cold side component 302 during operation of the combustion section 26 (FIG. 2).

The washer 360 includes a washer stud hole 370 for receiving the stud 324 therethrough. In this way, the washer 360 is secured by the fastening mechanism 320 when the fastening mechanism 320 is assembled and fastened as detailed above. The washer 360 includes one or more washer cooling holes 372 that each extends through the washer 360 from the first washer surface 362 to the second washer surface 364. The one or more washer cooling holes 372 are disposed in the bend portion 368 of the washer 360. The one or more washer cooling holes 372 are disposed within the space 322 when the coupling assembly 300 is assembled. In this way, the cooling air 380 is operably directed from the space 322 through the washer 360 and between the washer 360 and the cap 326, as detailed further below. The one or more washer cooling holes 372 may include any number of cooling holes, as desired.

In operation, cooling air 380 is caused to operably flow from the cold side of the cold side component 302, through the one or more cold side component cooling holes 308, and into the space 322. In the exemplary embodiment, the cooling air 380 is the compressed air 65 (FIG. 2) received from the compressor section of the turbine engine. The cooling air 380, however, may be supplied from any source, as desired. The cooling air 380 is operably directed from the space 322, through the one or more washer cooling holes 372, and between the washer 360 and the cap 326. At the same time, the cooling air 380 is operably directed from the space 322 through the one or more hot side component cooling holes 310 and into the combustion chamber 210 to film cool the hot side component 304. The cooling air 380 is operably directed from between the washer 360 and the cap 326 through the one or more first cap cooling holes 350 and into the hollow interior 328 of the cap 326. In this way, the cooling air 380 fills the hollow interior 328. The cooling air 380 is operably directed from the hollow interior 328 through the one or more second cap cooling holes 352 and into the combustion chamber 210 to film cool the cap 326.

Accordingly, the cap 326 having a hollow interior 328, the one or more first cap cooling holes 350, and the one or more second cap cooling holes 352 provides for a cooling arrangement that avoids direct exposure of the stud 324 to the hot combustion gases in the combustion chamber 210. The cooling air 380 in the hollow interior 328 provides a cushion of cooling air 380 between the combustion chamber 210 and the stud 324. The film cooling through the cap 326 provides a layer of cooling air 380 between the hot side of the exterior surface 330 of the cap 326 and the hot air stream (e.g., the hot combustion gases). The film cooling thus protects the cap 326, and the cushion of cooling air 380 in the hollow interior 328 of the cap 326 protects the stud 324 from being exposed to the hot combustion gases and provides additional cooling for the stud 324. Therefore, the thermal gradients in an area of one or more fastening mechanisms 320 are reduced, thereby reducing the stress concentration on the one or more fastening mechanisms 320. Thus, the coupling assembly 300 provides for reducing damage to and/or for reducing failure of the hot side component 304 and/or of the cold side component 302 in an area about the one or more fastening mechanisms 320.

Figure 4:
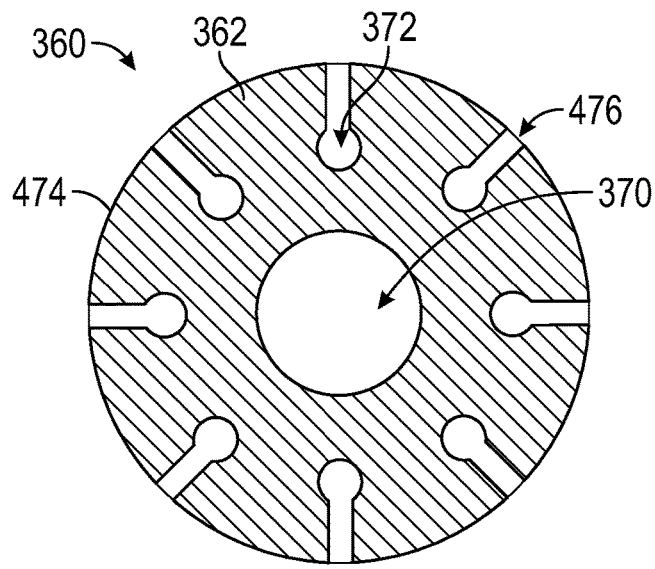
FIG. 4 is a top view of a washer isolated from the coupling assembly of FIG. 3, according to the present disclosure.

FIG. 4 is a top view of the washer 360 isolated from the coupling assembly 300 (FIG. 3), according to the present disclosure. FIG. 4 shows the washer 360 in an un-bent orientation such that washer 360 is flattened. The washer 360 can be bent or otherwise can be distorted to form the generally frustoconical shape shown in FIG. 3. In the un-bent configuration, the washer 360 defines a generally circular shape. The washer 360 may include any shape and/or any size, as desired. The washer 360 includes an outer edge 474 that defines an outer perimeter of the washer 360. The washer stud hole 370 is located at a radial center of the washer 360. The one or more washer cooling holes 372 are disposed radially outward from the washer stud hole 370 and are disposed circumferentially about the washer 360. In this way, the one or more washer cooling holes 372 are located between the outer edge 474 and the washer stud hole 370.

The washer 360 also includes one or more washer slots 476 disposed circumferentially about the outer edge 474. Each washer slot 476 extends radially inward from the outer edge 474 to a respective washer cooling hole 372. In this way, the one or more washer slots 476 allow the washer 360 to be bent in an area about the outer edge 474 such that the washer 360 is fit between the cold side component 302 (FIG. 3) and the hot side component 304 (FIG. 3). The bending of the washer 360 allows the washer 360 to flex or to compress such that the hot side component 304 can move radially with respect to the cold side component 302 and prevents the hot side component 304 from contacting the cold side component 302.

Figure 5:
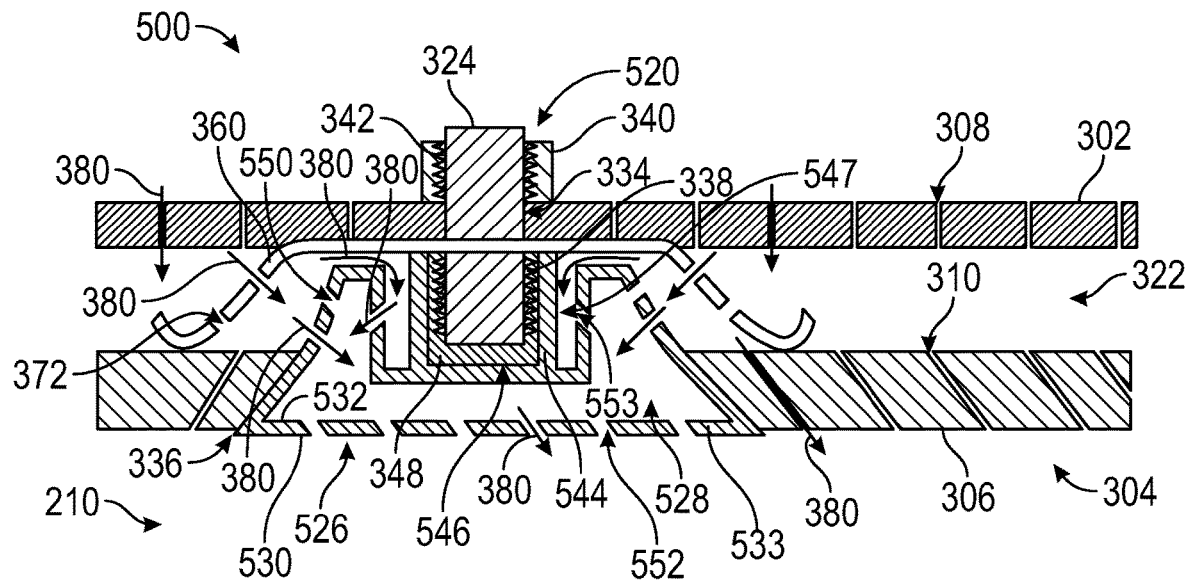
FIG. 5 is a schematic partial cross-sectional view of a portion of a coupling assembly for the combustion section of the turbine engine of FIG. 1, taken at a centerline axis of the turbine engine, according to another embodiment.

FIG. 5 is a schematic partial cross-sectional view of a portion of a coupling assembly 500 for a combustion section (FIGS. 1 and 2) of a turbine engine 10 (FIG. 1), taken at a centerline axis of the turbine engine 10 (FIG. 1), according to another embodiment. The coupling assembly 500 is substantially similar to the coupling assembly 300 of FIG. 3. For example, the coupling assembly 500 includes one or more fastening mechanisms 520 including the stud 324 and a cap 526. The cap 526 includes a generally frustoconical shape with a hollow interior 528 such that the cap 526 includes an exterior surface 530 and an interior surface 532. The exterior surface 530 and the interior surface 532 together form a thin wall 533 such that the hollow interior 528 includes a shape that generally corresponds to a shape of the cap 526. In this way, the hollow interior 528 is an enclosed hollow interior 528. Accordingly, the hollow interior 528 defines a reservoir that is filled with cooling air during operation of the turbine engine 10 (FIG. 1), as detailed further below. The cap 526 and the hollow interior 528 each include a diameter larger than an outer diameter of the stud 324. The cap 526 is positioned between the stud 324 and the combustion chamber 210 such that the stud 324 is insulated from the combustion chamber 210. In this way, the stud 324 is not directly exposed to the combustion chamber 210. For example, the stud 324 is spaced radially from the combustion chamber 210. The cap 526 also includes one or more first cap cooling holes 550 and one or more second cap cooling holes 552. The cap 526, however, is different than the cap 326 of FIG. 3.

The cap 526 includes a stud receiving portion 544 that defines a stud opening 546 for receiving a portion of the stud 324. The cap 526 defines a radial gap or a radial space 547 about the stud receiving portion 544. The radial space 547 extends radially from the exterior surface 530 of the stud receiving portion 544 to another portion of the exterior surface 530 of the cap 526. For example, the exterior surface 530 defines a generally U-shaped portion in an area of the radial space 547. The radial space 547 may include any size and/or any shape, as desired. The stud receiving portion 544 abuts the washer 360 when the coupling assembly 500 is assembled. The cap 526 also includes one or more third cap cooling holes 553 in the generally U-shaped portion of the exterior surface 530. A portion of the cold side of the exterior surface 530 of the cap 526 is spaced from the washer 360.

In operation, the cooling air 380 is operably directed between the washer 360 and the cold side of the exterior surface 530 of the cap 526, and into the radial space 547 to cool the stud receiving portion 544, thereby cooling the stud 324. The cooling air 380 is operably directed from the radial space 547 through the one or more third cap cooling holes 553 and into the hollow interior 528. In this way, the cooling air 380 fills the hollow interior 528 to provide a cushion of cooling air 380 between the combustion chamber 210 and the stud 324. The cooling air 380 is operably directed from the hollow interior 528 through the one or more second cap cooling holes 552 and into the combustion chamber 210 to provide film cooling, as detailed above with respect to FIG. 3. Accordingly, the radial space 547 provides additional cooling about the stud receiving portion 544, thereby providing additional cooling about the stud 324. The radial space 547 also provides additional flexibility such that the cap 526 can flex or can compress in an area about the radial space 547. Thus, if the hot combustion gases cause the cap 526 to move, the stress and the strain onto the stud 324 from the movement of the cap 526 is reduced.

Figure 6:
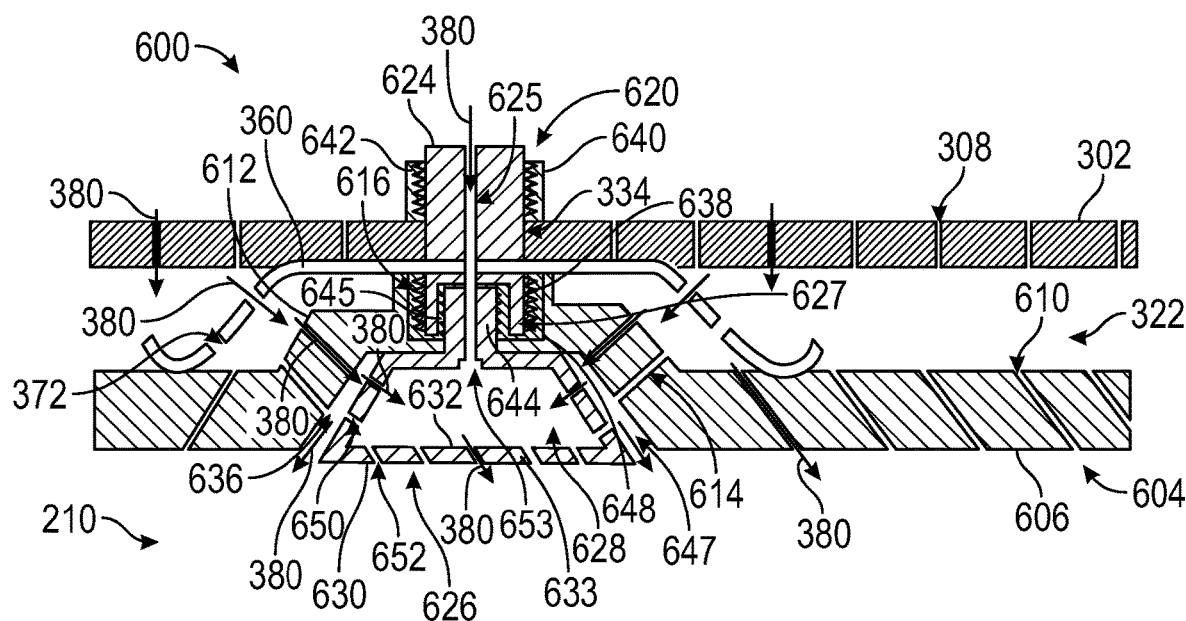
FIG. 6 is a schematic partial cross-sectional view of a portion of a coupling assembly for the combustion section of the turbine engine of FIG. 1, taken at a centerline axis of the turbine engine, according to another embodiment.

FIG. 6 is a schematic partial cross-sectional view of a portion of a coupling assembly 600 for a combustion section 26 (FIGS. 1 and 2) of a turbine engine 10 (FIG. 1), taken at a centerline axis of the turbine engine 10 (FIG. 1), according to another embodiment. The coupling assembly 600 includes the cold side component 302 and a hot side component 604. The hot side component 604 includes one or more tiles or panels 606 arranged on and coupled to a hot side of the cold side component 302. One panel 606 is depicted in FIG. 6, but the hot side component 604 may include any number of panels 606, as desired. The coupling assembly 600 includes one or more fastening mechanisms 620 for attaching and for connecting the hot side component 604 to the cold side component 302. The hot side component 604 includes one or more hot side component cooling holes 610.

Each panel 606 of the hot side component 604 includes a recessed portion 612 in an area about each of the one or more fastening mechanisms 620. The recessed portion 612 includes a portion of a respective panel 606 that is recessed with respect to the hot side of the hot side component 604. For example, the recessed portion 612 may extend from the hot side component 604 towards the cold side component 302. The recessed portion 612 may be the same or may be substantially similar to the recessed portion described in U.S. application Ser. No. 17/812,897, the contents of which are herein incorporated by reference in their entirety. A respective fastening mechanism 620 may be located centrally in the recessed portion 612 such that the respective fastening mechanism 620 is recessed or is otherwise retracted with respect to the hot side of the hot side component 604. The respective fastening mechanism 620 may be located anywhere within the recessed portion 612, as desired. Further, while the recessed portion 612 in the exemplary embodiment is generally circular in shape, the recessed portion 612 about each fastening mechanism 620 may include any shape or any size, as desired. The washer 360 is coupled between the hot side of the cold side component 302 and the cold side of the recessed portion 612. The washer 360 includes a larger diameter than that of the recessed portion 612 such that the washer 360 circumferentially surrounds the recessed portion 612. The recessed portion 612 includes one or more recessed portion cooling holes 614 extending therethrough. The one or more recessed portion cooling holes 614 extend from the cold side of the recessed portion 612 to the hot side of the recessed portion 612.

The recessed portion 612 also includes a stud receiving portion 616 that defines a gap or a space that is sized and shaped to receive a stud 624 of a respective fastening mechanism 620. The one or more fastening mechanisms 620 include the stud 624 and a cap 626. The stud 624 includes one or more stud cooling holes 625 extending therethrough. The one or more stud cooling holes 625 extend longitudinally through a length of the stud 624 from a cold side of the stud 624 to a hot side of the stud 624. In this way, the one or more stud cooling holes 625 provide fluid communication from the cold side of the cold side component 302 to a hollow interior 628 of the cap 626, as detailed further below. The stud 624 also includes a cap receiving portion 627 that is sized and is shaped to receive a portion of the cap 626, as detailed below.

The cap 626 includes a generally frustoconical shape with hollow interior 628 such that the cap 626 includes an exterior surface 630 and an interior surface 632. The exterior surface 630 and the interior surface 632 together form a thin wall 633 such that the hollow interior 628 includes a shape that generally corresponds to a shape of the cap 626. In this way, the hollow interior 628 is an enclosed hollow interior 628. Accordingly, the hollow interior 628 defines a reservoir that is filled with cooling air during operation of the turbine engine 10 (FIG. 1), as detailed further below. The stud 624 and the cap 626 may include any shape and/or any size, as desired. The cap 626 and the hollow interior 628 each include a diameter larger than an outer diameter of the stud 624. The cap 626 is coupled to the stud 624. When the cap 626 is coupled to the stud 624, the cap 626 is inserted into and is disposed in a recessed portion space 636 defined by the recessed portion 612 of the hot side component 604. A portion of the cap 626 is spaced from the cold side of the recessed portion 612 such that a gap or a space 647 is defined between the cap 626 and the recessed portion 612. The cap 626 is positioned between the stud 624 and the combustion chamber 210 such that the stud 624 is insulated from the combustion chamber 210. In this way, the stud 624 is not directly exposed to the combustion chamber 210. For example, the stud 624 is spaced radially from the combustion chamber 210.

The cap 626 includes a cap extension 644 that is sized and is shaped to fit into the cap receiving portion 627 of the stud 624. The cap extension 644 extends from a cold side of the exterior surface 630 of the cap 626. The cap extension 644 is inserted through an aperture in the recessed portion 612 and is received by the cap receiving portion 627 of the stud 624. When assembled, the cold side of the exterior surface 630 of the cap 626 abuts the hot side of the recessed portion 612. The hot side of the exterior surface 630 of the cap 626 is substantially flush or substantially in line with the hot side of the hot side component 604. In some embodiments, the cap 626 may extend beyond (e.g., radially inward) the hot side of the hot side component 604. In some embodiments, the cap 626 extends to a location radially outward of the hot side of the hot side component 604.

The recessed portion 612 includes an insert 648 disposed within the stud receiving portion 616 for coupling the stud 624 and the cap 626. The stud 624 includes threads such that the stud 624 is coupled to the insert 648 by corresponding threads on the insert 648 at a first threaded connection 638. The stud 624 also includes threads such that the stud 624 is coupled to a nut 640 by corresponding threads on the nut 340 at a second threaded connection 642. The cap 626 includes threads such that the cap 626 is coupled to the insert 648 by corresponding threads on the insert 648 at a third threaded connection 645. For example, the cap 626 is coupled to the insert 648 by threads on the cap extension 644. In some embodiments, the stud 624 and/or the cap 626 are press fit into the insert 648 without the use of threaded connections. Any of the threaded connections may include other types of connections, such as, for example, press fitting, welding, brazing, adhesive, or the like. In some embodiments, the coupling assembly 600 does not include an insert 648 and the cap 626 is directly coupled to the stud 624.

The cap 626 includes one or more first cap cooling holes 650 extending therethrough, one or more second cap cooling holes 652 extending therethrough, and one or more third cap cooling holes 653 extending therethrough. The one or more first cap cooling holes 650, the one or more second cap cooling holes 652, and the one or more third cap cooling holes 653 each extends through the thin wall 633 from the exterior surface 630 to the interior surface 632 of the cap 626. The one or more first cap cooling holes 650 are disposed in the space 647 when the one or more fastening mechanisms 620 are secured. In this way, the one or more first cap cooling holes 650 provide fluid communication from the space 647 to the hollow interior 628 of the cap 626. The one or more second cap cooling holes 652 are disposed at a hot side of the cap 626. In this way, the one or more second cap cooling holes 652 provide fluid communication from the hollow interior 628 of the cap 626 to the combustion chamber 210. The one or more third cap cooling holes 653 extend through the cap extension 644 and are aligned with the one or more stud cooling holes 625. In this way, the one or more third cap cooling holes 653 provide fluid communication from the one or more stud cooling holes 625 to the hollow interior 628 of the cap 626. In some embodiments, the one or more first cap cooling holes 650, the one or more second cap cooling holes 652, and/or the one or more third cap cooling holes 653 are angled circumferentially to operably direct cooling air tangentially to the hollow interior 628 or to the combustion chamber 210, respectively.

In operation, in addition to the cooling arrangement detailed with respect to FIG. 3, the cooling air 380 is operably directed through the one or more washer cooling holes 372 to a space between the washer 360 and the recessed portion 612. The cooling air 380 is operably directed from the space between the washer 360 and the recessed portion 612 through the one or more recessed portion cooling holes 614 and into the space 647 between the recessed portion 612 and the cap 626. The cooling air 380 is operably directed from the space 647 through the one or more first cap cooling holes 650 and into the hollow interior 628 of the cap 626. In this way, the cooling air 380 fills the hollow interior 628. The cooling air 380 is then operably directed from the hollow interior 628 through the one or more second cap cooling holes 652 and into the combustion chamber 210 to provide film cooling at the hot side of the cap 626. At the same time, the cooling air 380 is operably directed through the one or more stud cooling holes 625, through the one or more third cap cooling holes 653, into the hollow interior 628, through the one or more second cap cooling holes 652, and into the combustion chamber 210. At the same time, the cooling air 380 is directed from the space 647 to the combustion chamber 210 to provide additional cooling in an area about the cap 626.

The coupling assembly 600 provides for an improved cooling arrangement for reducing the thermal gradient in an area about the one or more fastening mechanisms 620, as detailed above. For example, providing the recessed portion 612 moves the stud 624 away from the hot side of the hot side component 604 such that the stud 624 is spaced radially from the combustion chamber 210, and the cap 626 provides the improved cooling detailed above with respect to FIG. 3. For example, the cooling air 380 in the hollow interior 628 provides a cushion of cooling air 380 between the combustion chamber 210 and the stud 324. The cap 626 also provides for filling an abrupt step in the hot side component 604 (e.g., filling the recessed portion space 636) that is formed by the recessed portion 612. In this way, the cap 626 provides for a surface that is flush with the hot side of the hot side component 604 such that hot side of the hot side component 604 remains substantially flush and substantially smooth, thereby providing an improved cooling arrangement in an area about the one or more fastening mechanisms 620.

Figure 7:
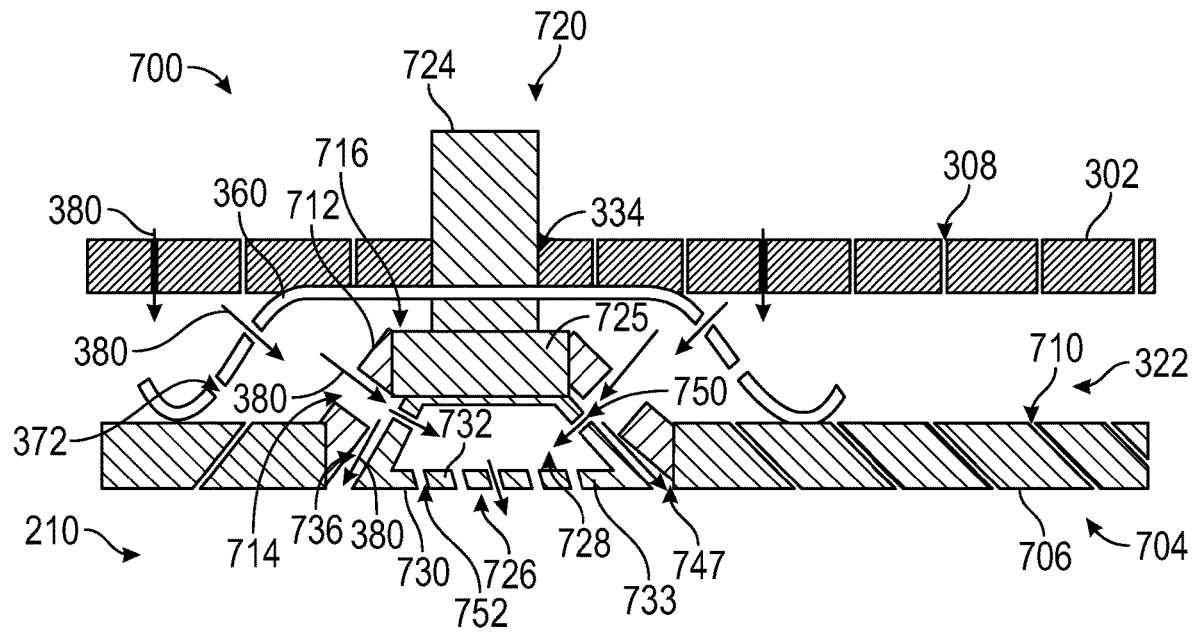
FIG. 7 is a schematic partial cross-sectional view of a portion of a coupling assembly for the combustion section of the turbine engine of FIG. 1, taken at a centerline axis of the turbine engine, according to another embodiment.

FIG. 7 is a schematic partial cross-sectional view of a portion of a coupling assembly 700 for a combustion section 26 (FIGS. 1 and 2) of a turbine engine 10 (FIG. 1), taken at a centerline axis of the turbine engine 10 (FIG. 1), according to another embodiment. The coupling assembly 700 includes the cold side component 302 and a hot side component 704. The hot side component 704 includes one or more tiles or panels 706 arranged on and coupled to a hot side of the cold side component 302. One panel 706 is depicted in FIG. 7, but the hot side component 704 may include any number of panels 706, as desired. The coupling assembly 700 includes one or more fastening mechanisms 720 for attaching and for connecting the hot side component 704 to the cold side component 302. The hot side component 704 includes one or more hot side component cooling holes 710.

The hot side component 704 is substantially similar to the hot side component 604 of FIG. 6. For example, the hot side component 704 includes a recessed portion 712 in an area surrounding each of the one or more fastening mechanisms 720. As shown in FIG. 7, the washer 360 does not contact the recessed portion 712. The washer 360 includes a larger diameter than that of the recessed portion 712 such that the washer 360 circumferentially surrounds the recessed portion 712. The recessed portion 712 includes one or more recessed portion cooling holes 714 extending therethrough. The one or more recessed portion cooling holes 714 extend from the cold side of the recessed portion 712 to the hot side of the recessed portion 712. The recessed portion 712 also includes a stud receiving portion 716 that defines a gap or a space that is sized and that is shaped to receive a stud 724 of a respective fastening mechanism 720.

The one or more fastening mechanisms 720 include the stud 724 and a cap 726. Although not shown, the one or more fastening mechanism 720 can also include a nut, as detailed above. The stud 624 includes a stud head 725 that is disposed in the stud receiving portion 716 of the recessed portion 712. The stud head 725 extends from the cold side of the recessed portion 612 to the hot side of the recessed portion 612 such that the stud head 725 is flush with both the cold side and the hot side of the recessed portion 612. The cap 726 is positioned between the stud 724 and the combustion chamber 210 such that the stud 724 is insulated from the combustion chamber 210. In this way, the stud 724 is not directly exposed to the combustion chamber 210. For example, the stud 724 is spaced radially from the combustion chamber 210.

The cap 726 includes a generally frustoconical shape with a hollow interior 728 such that the cap 726 includes an exterior surface 730 and an interior surface 732. The exterior surface 730 and the interior surface 732 together form a thin wall 733 such that the hollow interior 728 includes a shape that generally corresponds to a shape of the cap 726. In this way, the hollow interior 728 is an enclosed hollow interior 728. Accordingly, the hollow interior 728 defines a reservoir that is filled with cooling air during operation of the turbine engine 10 (FIG. 1), as detailed further below. The stud 724 and the cap 726 may include any shape and/or any size, as desired. The cap 726 and the hollow interior 728 each include a diameter larger than an outer diameter of the stud 724. The cap 726 is coupled to the stud 724. For example, a cold side of the cap 726 is coupled to the stud head 725. The cap 726 can be coupled to the stud 724, for example, by welding, brazing, adhesive, or the like. In some embodiments, the cap 726 is formed integrally with the stud 724 such that the stud 724 and the cap 726 form a single, unitary component. When the cap 726 is coupled to the stud 724, the cap 726 is inserted and is disposed in a second fastening mechanism aperture 736 defined by the recessed portion 712 of the hot side component 704. A portion of the cap 726 is spaced from the cold side of the recessed portion 712 such that a gap or a space 747 is defined between the cap 726 and the recessed portion 712.

The cap 726 includes one or more first cap cooling holes 750 extending therethrough and one or more second cap cooling holes 752 extending therethrough. The one or more first cap cooling holes 750 and the one or more second cap cooling holes 752 each extends through the thin wall 733 from the exterior surface 730 to the interior surface 732 of the cap 726. The one or more first cap cooling holes 750 are disposed in the space 747 when the one or more fastening mechanisms 720 are secured. In this way, the one or more first cap cooling holes 750 provide fluid communication from the space 747 to the hollow interior 728 of the cap 726. The one or more second cap cooling holes 752 are disposed at a hot side of the cap 726. In this way, the one or more second cap cooling holes 752 provide fluid communication from the hollow interior 728 of the cap 726 to the combustion chamber 210. In some embodiments, the one or more first cap cooling holes 750 and/or the one or more second cap cooling holes 752 are angled circumferentially to operably direct cooling air tangentially to the hollow interior 728 or to the combustion chamber 210, respectively. The cooling air 380 is operably directed through the coupling assembly 700 similarly as to the coupling assembly 600 described with respect to FIG. 6. For example, the cooling air 380 is operably directed into the hollow interior 728 of the cap 726 to provide a cushion of cooling air 380 between the combustion chamber 210 and the stud 324.

Figure 8A:
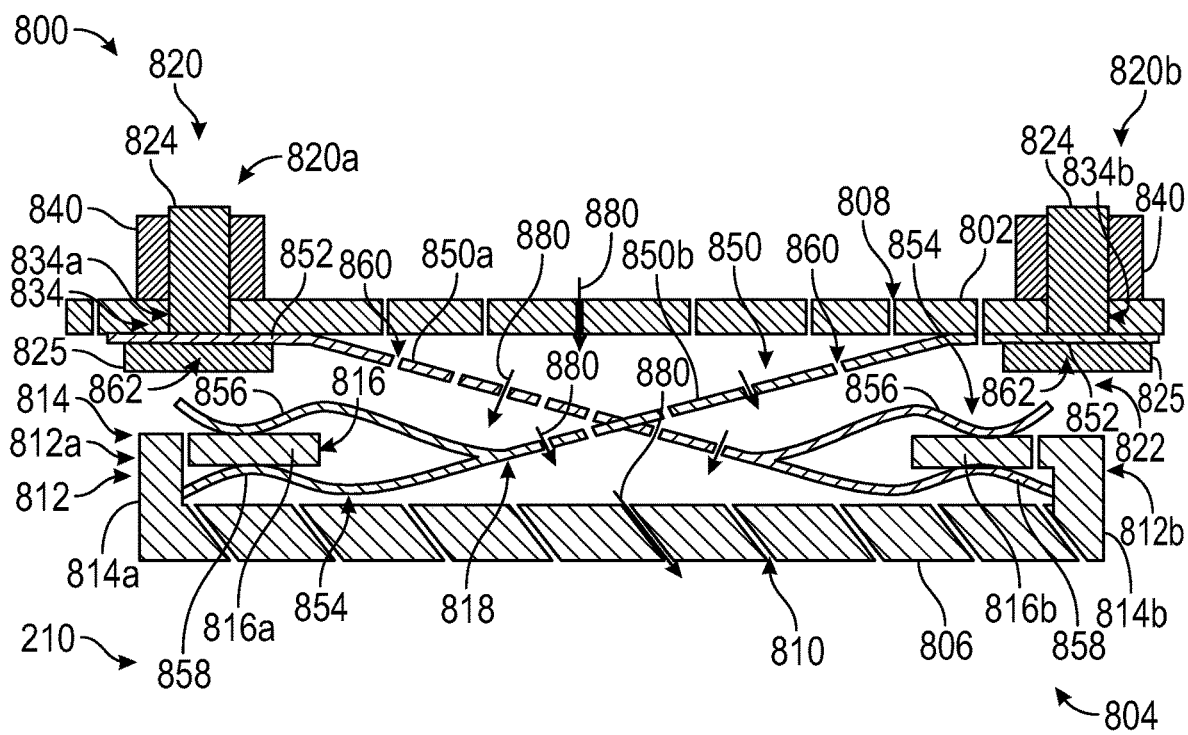
FIG. 8A is a schematic partial cross-sectional view of a portion of a coupling assembly for the combustion section of the turbine engine of FIG. 1, taken at a centerline axis of the turbine engine, according to another embodiment.

FIG. 8A is a schematic partial cross-sectional view of a portion of a coupling assembly 800 for a combustion section 26 (FIGS. 1 and 2) of a turbine engine 10 (FIG. 1), taken at a centerline axis of the turbine engine 10 (FIG. 1), according to another embodiment. FIG. 8A shows the coupling assembly 800 includes a cold side component 802 and a hot side component 804. The hot side component 804 includes one or more tiles or panels 806 arranged on and coupled to a hot side of the cold side component 802. That is, the panels 806 of the hot side component 804 are coupled on a side of the cold side component 802 exposed to the combustion chamber 210. One panel 806 is depicted in FIG. 8A, but the hot side component 804 may include any number of panels 806, as desired.

The cold side component 802 includes one or more cold side component cooling holes 808 and the hot side component 804 includes one or more hot side component cooling holes 810. In this way, cooling air 380 (e.g., the compressed air 65 shown in FIG. 2) can pass through the cold side component 802 and can pass through the hot side component 804, as detailed further below. The one or more cold side component cooling holes 808 and the one or more hot side component cooling holes 810 may include any number of cooling holes formed in any orientation with respect to the cold side component 802 and the hot side component 804, respectively. In some embodiments, the one or more cold side component cooling holes 808 and the one or more hot side component cooling holes 810 are also angled circumferentially to operably direct cooling air tangentially.

The coupling assembly 800 includes a plurality of fastening mechanisms 820 for attaching and connecting the cold side component 802 and the hot side component 804 (e.g., each of the panels 806 of the hot side component 804). That is, the hot side component 804 is coupled by the plurality of fastening mechanisms 820 to the cold side component 802. FIG. 8A shows the plurality of fastening mechanisms 820 include a first fastening mechanism 820a and a second fastening mechanism 820b. The second fastening mechanism 820b is positioned axially downstream from the first fastening mechanism 820a. While FIG. 8A shows two fastening mechanisms 820, the plurality of fastening mechanisms 820 may include any number of fastening mechanisms, as desired. A gap or a space 822 is formed between the cold side component 802 and the hot side component 804. For example, the space 822 is formed between a radially outer surface (e.g., the cold side) of hot side component 804 and a radially inner surface (e.g., the hot side) of the cold side component 802.

The plurality of fastening mechanisms 820 each includes a stud 824 and a nut 840 connected together by a threaded connection. The plurality of fastening mechanisms 820 may include any type of known fastening mechanism such as, for example, bolts, screws, nuts, rivets, or the like. The stud 824 includes a generally cylindrical body that defines the stud 824. The stud 824 may include any shape and/or any size, as desired. The stud 824 is inserted through a fastening mechanism aperture 834 of the cold side component 802. For example, the stud 824 of the first fastening mechanism 820a is inserted through a first fastening mechanism aperture 834a and the stud 824 of the second fastening mechanism 820b is inserted through a second fastening mechanism aperture 834b. The stud 824 also includes a stud head 825 disposed on the hot side of the cold side component 802. In this way, the stud head 825 is located away from the hot side component 804 such that the stud 824 and the stud head 825 are insulated from the hot combustion gases in the combustion chamber 210. In FIG. 8A, the stud 824 does not directly couple the hot side component 804 and the cold side component 802. Rather, the coupling assembly 800 includes a plurality of flexible plates 850 that couple the hot side component 804 to the cold side component 802, as detailed further below. The plurality of flexible plates 850 can be made of metal, ceramic, or combinations thereof. In some embodiments, the plurality of flexible plates 850 are made of a CMC.

The hot side component 804 includes a plurality of flanges 812 that the plurality of flexible plates 850 engage or otherwise hold to couple the hot side component 804 to the cold side component 802. The plurality of flanges 812 include a first flange 812a and a second flange 812b. The second flange 812b is positioned downstream of the first flange 812a. In other words, the first flange 812a is positioned upstream of the second flange 812b.

Each of the plurality of flanges 812 includes a radial flange portion 814 that extends substantially radially from the hot side component 804. For example, the radial flange portion 814 extends radially from a cold side of the hot side component 804 towards the cold side component 802. The first flange 812a includes a first radial flange portion 814a and the second flange 812b includes a second radial flange portion 814b. The radial flange portion 814 of each flange 812 defines an axial end of a respective panel 806 of the hot side component 804. For example, the first radial flange portion 814a is positioned at a first axial end of the panel 806 and the second radial flange portion 814b is positioned at a second axial end of the panel 806 opposite the first axial end. Each radial flange portion 814 is generally axially aligned with a respective fastening mechanism 820 such that the panel 806 extends axially between the first fastening mechanism 820a and the second fastening mechanism 820b. Such an arrangement provides for balancing the panel 806 when the panel 806 is coupled to the cold side component 802, as detailed further below. The panel 806, however, may include any axial length as desired.

Each of the plurality of flanges 812 also includes an axial flange portion 816 that extends axially from the radial flange portion 814. The first flange 812a includes a first axial flange portion 816a and the second flange 812b includes a second axial flange portion 816b. The first axial flange portion 816a extends axially downstream from the first radial flange portion 814a. The second axial flange portion 816b extends axially upstream from the second radial flange portion 814b. In this way, a gap or a space 818 is defined between the first flange 812a and the second flange 812b. The space 818 extends axially between the first flange 812a and the second flange 812b, as well as radially between the cold side of the hot side component 804 and the axial flange portion 816 of each flange 812.

Figure 8B:
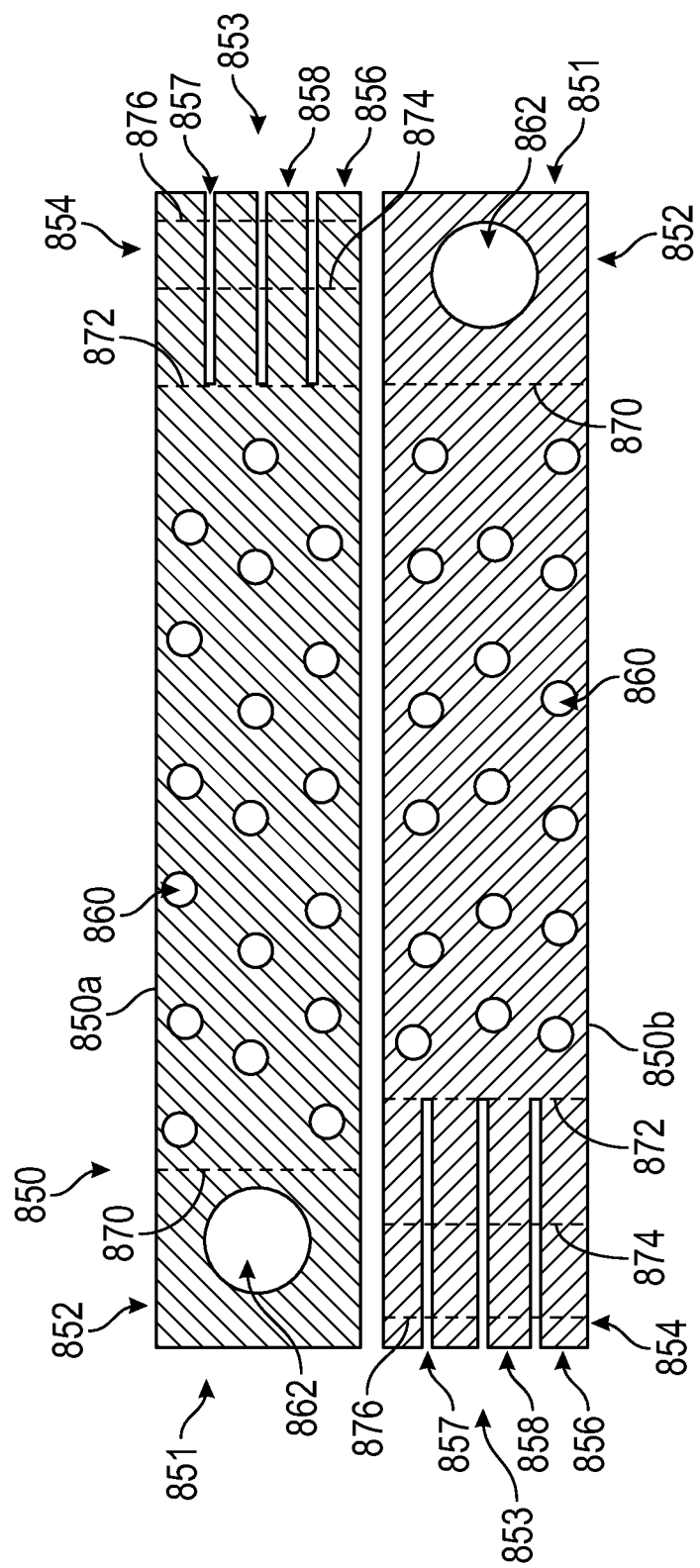
FIG. 8B is a top view of a plurality of flexible plates isolated from the coupling assembly of FIG. 8A, according to the present disclosure.

The plurality of flexible plates 850 extend between a fastening mechanism coupling portion 852 and a flange coupling portion 854. The fastening mechanism coupling portion 852 includes a fastening mechanism aperture 862 (FIG. 8B) such that a respective fastening mechanism 820 is inserted through the fastening mechanism aperture 862 (FIG. 8B). In this way, a respective flexible plate 850 is coupled to a respective fastening mechanism 820. For example, a first flexible plate 850a is coupled to the first fastening mechanism 820a and a second flexible plate 850b is coupled to the second fastening mechanism 820b. The first flexible plate 850a extends from the first fastening mechanism 820a to the second flange 812b of the panel 806. In this way, the first flexible plate 850a extends in both a radial direction and an axial direction. For example, the first flexible plate 850a extends radially inwardly at an angle from the first fastening mechanism 820a towards the second flange 812b and extends axially downstream from the first fastening mechanism 820a to the second flange 812b. The first flexible plate 850a radially overlaps the second flexible plates 850b at a substantially axial center of the first flexible plate 850a and of the second flexible plate 850b. In this way, the first flexible plate 850a is disposed in the space 822 between the cold side component 802 and the hot side component 804 and extends through the space 818.

Similarly, the second flexible plate 850b extends from the second fastening mechanism 820b to the first flange 812a of the panel 806. In this way, the second flexible plate 850b extends in both a radial direction and an axial direction. For example, the second flexible plate 850b extends radially inward at an angle from the second fastening mechanism 820b towards the first flange 812a and extends axially upstream from the second fastening mechanism 820b to the first flange 812a. In this way, the second flexible plate 850b is disposed in the space 822 between the cold side component 802 and the hot side component 804, and extends through the space 818.

Each flexible plate 850 is coupled to a respective flange 812 by the flange coupling portion 854. For example, the flange coupling portion 854 includes one or more first projections 856 and one or more second projections 858 that are separated at the flange coupling portion 854, as detailed further below. The one or more second projections 858 are separated from the one or more first projections 856 by one or more slots 857 (FIG. 8B). The one or more first projections 856 are bent from the flange coupling portion 854 and engage a cold side of the axial flange portion 816. The one or more second projections 858 are bent to form the flange coupling portion 854 and engage a hot side of the axial flange portion 816. In this way, the one or more first projections 856 and the one or more second projections 858 together hold or couple the respective axial flange portion 816. For example, the axial flange portion 816 is press fit between the one or more first projections 856 and the one or more second projections 858. Accordingly, the first flexible plate 850a and the second flexible plate 850b together couple and secure the hot side component 804 (e.g., the panels 806) to the cold side component 802.

The plurality of flexible plates 850 each includes one or more flexible plate cooling holes 860 extending therethrough. The one or more flexible plate cooling holes 860 extend from a cold side to a hot side of the plurality of flexible plates 850 to provide fluid communication through the plurality of flexible plates 850. The one or more flexible plate cooling holes 860 are disposed in the space 822 when coupling assembly 800 is assembled. In this way, the one or more flexible plate cooling holes 860 provide fluid communication from the space 822 to the one or more hot side component cooling holes 810. The one or more flexible plate cooling holes 860 can be angled radially and/or circumferentially through the plurality of flexible plates 850 to operably direct cooling air tangentially through the plurality of flexible plates 850.

The plurality of flexible plates 850 provide flexibility such that the panels 806 of the hot side component 804 can move with respect to the cold side component 802. For example, the plurality of flexible plates 850 can compress or can flex such that the panels 806 can move with respect to the cold side component 802. The plurality of flexible plates 850 are flexible in multiple degrees of freedom such that the panels 806 can move radially, axially, circumferentially, or a combination thereof, with respect to the cold side component 802. For example, the plurality of flexible plates 850 being circumferentially spaced provides for additional circumferential flexibility compared to coupling assemblies without the benefit of the present disclosure.

In operation, cooling air 880 is operably directed from the cold side of the cold side component 802, through the one or more cold side component cooling holes 808, and into the space 822 between the hot side of the cold side component 802 and the plurality of flexible plates 850. In the exemplary embodiment, the cooling air 880 is the compressed air 65 (FIG. 2) received from the compressor section of the turbine engine. The cooling air 880, however, may be supplied from any source, as desired. The cooling air 880 is operably directed from the space 822, through the one or more flexible plate cooling holes 860, and between the plurality of flexible plates 850 and the cold side of the hot side component 804. The cooling air 880 is then operably directed from the space 822 through the one or more hot side component cooling holes 810 and into the combustion chamber 210 to film cool the hot side of the hot side component 804.

FIG. 8B is a top view of the plurality of flexible plates 850 isolated from the coupling assembly 800 (FIG. 8A), according to the present disclosure. FIG. 8B shows the plurality of flexible plates 850 in an un-bent orientation such that plurality of flexible plates are flattened. The plurality of flexible plates 850 can be bent or otherwise can be distorted to form the shape shown in FIG. 8A. In the un-bent configuration, the plurality of flexible plates 850 each defines a generally rectangular shape. The plurality of flexible plates 850 may include any shape and/or any size, as desired. The plurality of flexible plates 850 are circumferentially spaced from each other. For example, the first flexible plate 850a is circumferentially spaced from the second flexible plate 850b and is positioned circumferentially adjacent the second flexible plate 850b. In one embodiment, the first flexible plate 850a is positioned circumferentially aft of the second flexible plate 850b. The first flexible plate 850a and the second flexible plate 850b are generally axially aligned. In this way, the plurality of flexible plates 850 provide balance of the hot side component in the circumferential direction, as well as in the axial direction and in the radial direction. In some embodiments, the first flexible plate 850a is positioned circumferentially forward of the second flexible plate 850b.

The plurality of flexible plates 850 extend from a proximal, first end 851 to a distal, second end 853 opposite the first end 851. The fastening mechanism coupling portion 852 is located at the first end 851 and the flange coupling portion 854 is located at the second end 853. The fastening mechanism aperture 862 is located at the fastening mechanism coupling portion 852. The one or more first projections 856 and the one or more second projections 858 are located at the flange coupling portion 854. The one or more flexible plate cooling holes 860 are located axially between the fastening mechanism coupling portion 852 and the flange coupling portion 854.

Each flexible plate 850 (e.g., the first flexible plate 850a and the second flexible plate 850b) includes one or more first bends 870, one or more second bends 872, one or more third bends 874, and one or more fourth bends 876. FIG. 8B depicts each of the bends by dashed lines. The one or more first bends 870 are defined at the fastening mechanism coupling portion 852 such that the flexible plate 850 extends radially inward from the fastening mechanism coupling portion 852 (shown in FIG. 8A). The one or more second bends 872 are defined at the flange coupling portion 854. In this way, the flexible plate 850 defines a generally straight portion (e.g., free of bends) between the one or more first bends 870 and the one or more second bends 872.

The one or more second bends 872 can include a bend of the one or more first projections 856 in a first radial direction and can include a bend of the one or more second projections 858 in a second radial direction. For example, the one or more first projections 856 can be bent radially outwardly at the one or more second bends 872 and the one or more second projections 858 can be bent radially inwardly at the one or more second bends 872. In this way, the one or more first projections 856 and the one or more second projections 858 split into different directions at the one or more second bends 872 (as depicted in FIG. 8A). The one or more third bends 874 are defined at the one or more first projections 856 and at the one or more second projections 858. For example, the one or more first projections 856 are bent radially inwardly at the one or more third bends 874 and the one or more second projections 858 are bent radially outwardly at the one or more third bends 874 (as depicted in FIG. 8A). In this way, the one or more first projections 856 include a portion that engages with the cold side of the axial flange portion 816, and the one or more second projections 858 include a portion that engages with the hot side of the axial flange portion 816. The one or more fourth bends 876 are defined at the one or more first projections 856 and at the one or more second projections 858. For example, the one or more first projections 856 are bent radially outwardly at the one or more fourth bends 876 and the one or more second projections 858 are bent radially inwardly at the one or more fourth bends 876. In this way, the one or more first projections 856 and the one or more second projections 858 engage the axial flange portion 816 at the one or more fourth bends 876 (as depicted in FIG. 8A). Thus, the bends of the flange coupling portion 854 allow for the one or more first projections 856 and the one or more second projections 858 to engage and to hold the panel 806 at the axial flange portion 816. The plurality of flexible plates 850 may include any number of bends, in any orientation, as desired, for engaging the axial flange portion 816 of the panel 806.

Referring again to FIG. 8A, the coupling assembly 800 provides for a cooling arrangement that avoids direct exposure of the plurality of fastening mechanisms 820 to the hot combustion gases in the combustion chamber 210. The coupling assembly 800 provides for separating the plurality of fastening mechanisms 820 from the hot side component 804 such that the plurality of fastening mechanisms 820 are not exposed to the hot combustion gases. For example, the plurality of fastening mechanisms 820 are insulated from the combustion chamber 210. The plurality of flexible plates 850 engage the panel 806 of the hot side component 804 such that the hot side component 804 is coupled to the cold side component 802 without the need of the fastening mechanisms 820 to directly contact the hot side component 804. Therefore, the thermal gradients in an area of plurality of fastening mechanisms 820 are reduced, thereby reducing the stress concentration on the plurality of fastening mechanisms 820. The flexibility of the plurality of flexible plates 850 allows the panels 806 to move while also reducing the stress on the plurality of fastening mechanisms 820 compared to arrangements in which the fastening mechanisms 820 are directly contacting the hot side component 804. The projections of flange coupling portion 854 of the flexible plates 850 also includes flexibility such that the flange coupling portion 854 provides frictional damping when the hot side component 804 moves with respect to the cold side component 802. Thus, the coupling assembly 800 provides for reducing damage and/or for reducing failure of the hot side component 804 and/or of the cold side component 802 in an area about the plurality of fastening mechanisms 820.

FIG. 9A is a schematic partial cross-sectional view of a portion of a coupling assembly 900 for a combustion section 26 (FIGS. 1 and 2) of a turbine engine 10 (FIG. 1), taken at a centerline axis of the turbine engine 10 (FIG. 1), according to another embodiment. The coupling assembly 900 is substantially similar to the coupling assembly 800 of FIG. 8A. For example, the coupling assembly 900 includes the cold side component 802, the hot side component 804, the panels 806, the plurality of fastening mechanisms 820, and the plurality of flanges 812. The coupling assembly 900, however, includes a plurality of flexible plates 950 that are different than the plurality of flexible plates 850 of FIGS. 8A and 8B. FIG. 9B is a top view of the plurality of flexible plates 950 isolated from the coupling assembly 900 (FIG. 9A), according to the present disclosure.

With reference to FIGS. 9A and 9B, the plurality of flexible plates 950 include a first flexible plate 950a and a second flexible plate 950b. The plurality of flexible plates 950 extend between a fastening mechanism coupling portion 952 and a flange coupling portion 954. The plurality of flexible plates 950 include a plurality of fastening mechanisms apertures 962. For example, the fastening mechanism coupling portion 952 includes a first fastening mechanism aperture 962a such that a respective fastening mechanism 820 is inserted through the first fastening mechanism aperture 962a. In this way, a respective flexible plate 950 is coupled to a respective fastening mechanism 820. For example, the first flexible plate 950a is coupled to the first fastening mechanism 820a and the second flexible plate 950b is coupled to the second fastening mechanism 820b. The flange coupling portion 954 includes a second fastening mechanism aperture 962b. In this way, the plurality of flexible plates 950 can be oriented such that the respective fastening mechanisms 820 are inserted through the first fastening mechanism aperture 962a or can be oriented such that the respective fastening mechanisms 820 are inserted through the second fastening mechanism aperture 962b. Such an arrangement provides for ease of manufacturing while the coupling assembly 900 is being assembled.

The first flexible plate 950a extends from the first fastening mechanism 820a to the second flange 812b of the panel 806, as detailed above. The first flexible plate 950a radially overlaps the second flexible plates 950b at a substantially axial center of the first flexible plate 950a and of the second flexible plate 950b (shown in FIG. 9A). In this way, the first flexible plate 950a is disposed in the space 822 between the cold side component 802 and the hot side component 804 and extends through the space 818. Similarly, the second flexible plate 950b extends from the second fastening mechanism 820b to the first flange 812a of the panel 806, as detailed above. In this way, the second flexible plate 950b is disposed in the space 822 between the cold side component 802 and the hot side component 804, and extends through the space 818.

Each flexible plate 950 is coupled to a respective flange 812 by the flange coupling portion 954. The flange coupling portion 954, however, does not include one or more projections like the flange coupling portion 854 detailed with respect to FIG. 8A. Rather, the flange coupling portion 954 is inserted in the space 818 to engage with the hot side of the axial flange portion 816 such that flange coupling portion 954 radially supports the panel 806 at the axial flange portion 816. The flange coupling portion 954 is secured to the axial flange portion 816 by, for example, welding, brazing, adhesive, or the like. Accordingly, the first flexible plate 950a and the second flexible plate 950b together couple and secure the hot side component 804 (e.g., the panels 806) to the cold side component 802 such that the plurality of fastening mechanisms 820 do not directly engage the hot side component 804. In this way, the fastening mechanisms 820 are insulated from the combustion chamber 210.

The plurality of flexible plates 950 each includes one or more flexible plate cooling holes 960 extending therethrough. The one or more flexible plate cooling holes 960 extend from a cold side to a hot side of the plurality of flexible plates 950 to provide fluid communication through the plurality of flexible plates 950. The one or more flexible plate cooling holes 960 are disposed in the space 822 when coupling assembly 900 is assembled. In this way, the one or more flexible plate cooling holes 960 provide fluid communication from the space 822 to the one or more hot side component cooling holes 810. The one or more flexible plate cooling holes 960 can be angled radially and/or circumferentially through the plurality of flexible plates 950 to operably direct cooling air tangentially through the plurality of flexible plates 850.

FIG. 9B shows the first flexible plate 950a is circumferentially spaced from the second flexible plate 850b and is positioned circumferentially adjacent the second flexible plate 950b. For example, the first flexible plate 950a is positioned circumferentially aft of the second flexible plate 950b. In this way, the plurality of flexible plates 950 are circumferentially spaced from each other. The first flexible plate 950a and the second flexible plate 950b are generally axially aligned. In this way, the plurality of flexible plates 950 provide balance of hot side component 804 (FIG. 9A) in the circumferential direction, as well as in the axial direction and in the radial direction. In some embodiments, the first flexible plate 950a is positioned circumferentially forward of the second flexible plate 950b.

The plurality of flexible plates 950 extend from a proximal, first end 951 (FIG. 9B) to a distal, second end 953 (FIG. 9B) opposite the first end 951. The fastening mechanism coupling portion 952 is located at the first end 951 and the flange coupling portion 954 is located at the second end 953. The first fastening mechanism aperture 962a is located at the fastening mechanism coupling portion 952 and the second fastening mechanism aperture 962b is located at the flange coupling portion 954. FIG. 9B shows the one or more flexible plate cooling holes 960 are located axially between the fastening mechanism coupling portion 952 and the flange coupling portion 954.

Each flexible plate 950 (e.g., the first flexible plate 950a and the second flexible plate 950b) includes a first bend 970 and a second bend 972. FIG. 9B depicts each of the bends by dashed lines. The first bend 970 is defined at the fastening mechanism coupling portion 952 such that the flexible plate 950 extends radially inward from the fastening mechanism coupling portion 952 (shown in FIG. 9A). The second bend 972 is defined at the flange coupling portion 954 such that the flexible plate 950 extends from the second bend 972 generally axially. In this way, the flexible plate 950 defines a generally straight portion (e.g., free of bends) between the first bend 970 and the second bend 972. The portion of the flexible plate 950 that extends axially from the second bend 972 is inserted into the space 818 (FIG. 9A) and engages the cold side of the axial flange portion 816 to support the panel 806 of the hot side component 804.

The plurality of flexible plates 950 provide flexibility such that the panels 806 of the hot side component 804 can move with respect to the cold side component 802. For example, the plurality of flexible plates 950 can compress or can flex such that the panels 806 can move with respect to the cold side component 802. The plurality of flexible plates 950 are flexible in multiple degrees of freedom such that the panels 806 can move radially, axially, circumferentially, or a combination thereof, with respect to the cold side component 802.

In operation, cooling air 880 is operably directed from the cold side of the cold side component 802, through the one or more cold side component cooling holes 808, and into the space 822 between the hot side of the cold side component 802 and the plurality of flexible plates 950. The cooling air 880 is operably directed from the space 822, through the one or more flexible plate cooling holes 960, and between the plurality of flexible plates 950 and the cold side of the hot side component 804. The cooling air 880 is then operably directed from the space 822 through the one or more hot side component cooling holes 810 and into the combustion chamber 210 to film cool the hot side of the hot side component 804. The plurality of flexible plates 950 provides for ease of manufacturing compared to the plurality of flexible plates 850 of FIGS. 8A and 8B. The coupling of the plurality of flexible plates 950 to the axial flange portion 816 reduces wear due to the flange coupling portion 954 being coupled to the axial flange portion 816 such that the flange coupling portion 954 does not slide or move with respect to the axial flange portion 816.

The embodiments of the present disclosure provide for improved cooling arrangements such that the one or more fastening mechanisms of the combustion section are not directly exposed to the hot combustion gases in the combustion chamber. Thus, the embodiments of the present disclosure help to reduce the thermal gradients in an area about the fastening mechanisms, thereby reducing a stress concentration in the area about the fastening mechanisms. Accordingly, the embodiments of the present disclosure provide for reducing damage and/or for reducing failure of the hot side component and/or of the cold side component in an area about the fastening mechanisms.

Further aspects are provided by the subject matter of the following clauses.

A coupling assembly for a turbine engine comprises a cold side component, a hot side component, the cold side component and the hot side component together at least partially forming a combustion chamber, and a fastening mechanism coupling the hot side component to the cold side component, the fastening mechanism comprising a stud disposed through the cold side component, and a cap positioned on the stud, the cap defining a hollow interior and including one or more first cap cooling holes that operably direct cooling air into the hollow interior such that the hollow interior provides a cushion of cooling air between the combustion chamber and the stud.

The coupling assembly of the preceding clause, a space being defined between the cold side component and the hot side component, the stud being disposed in the space.

The coupling assembly of any preceding clause, the cap being disposed through the hot side component.

The coupling assembly of any preceding clause, the cap being positioned between the stud and the combustion chamber.

The coupling assembly of any preceding clause, the stud being radially spaced from the combustion chamber such that the stud is insulated from the combustion chamber.

The coupling assembly of any preceding clause, cap including one or more second cap cooling holes that operably direct the cooling air from the hollow interior into the combustion chamber.

The coupling assembly of any preceding clause, the hollow interior including a diameter that is larger than an outer diameter of the stud.

The coupling assembly of any preceding clause, the cap including a thin wall defined by an interior surface and an exterior surface, the thin wall defining a shape of the hollow interior.

The coupling assembly of any preceding clause, the shape of the hollow interior generally corresponding to a shape of the cap.

The coupling assembly of any preceding clause, further comprising a washer disposed between the cold side component and the hot side component, the washer being flexible such that the hot side component moves with respect to the cold side component and the washer prevents the hot side component from contacting the cold side component.

The coupling assembly of any preceding clause, the washer including one or more washer cooling holes that operably direct cooling air towards the cap.

The coupling assembly of any preceding clause, the washer including one or more washer slots that extend radially inward from an outer edge of the washer to the one or more washer cooling holes.

The coupling assembly of any preceding clause, the one or more first cap cooling holes operably directing the cooling air from the space to the hollow interior.

The coupling assembly of any preceding clause, the one or more cap including an exterior surface and an interior surface, the one or more first cap cooling holes extending through the thin wall from the exterior surface to the interior surface.

The coupling assembly of any preceding clause, the cold side component being a shell of a liner of the turbine engine, and the hot side component being a heat shield.

The coupling assembly any preceding clause, the cold side component being an annular dome assembly, and the hot side component being a deflector assembly.

The coupling assembly of any preceding clause, the cold side component including one or more cold side component cooling holes that operably direct the cooling air from a cold side of the cold side component to the space between the cold side component and the hot side component.

The coupling assembly of any preceding clause, the one or more cold side component cooling holes being impingement cooling holes.

The coupling assembly of any preceding clause, the hot side component including one or more hot side component cooling holes that operably direct the cooling air from the space to the combustion chamber.

The coupling assembly of any preceding clause, the one or more hot side component cooling holes being film cooling holes.

The coupling assembly of any preceding clause, the stud being inserted through a first fastening mechanism aperture of the cold side component, and the cap being inserted through a second fastening mechanism aperture of the hot side component.

The coupling assembly of any preceding clause, the hot side component including one or more panels that together form the hot side component.

The coupling assembly of any preceding clause, each panel of the one or more panels being coupled to the cold side component by one or more fastening mechanisms.

The coupling assembly of any preceding clause, the cap being coupled to the stud by a first threaded connection.

The coupling assembly of any preceding clause, the cap being press fit onto the stud.

The coupling assembly of any preceding clause, the cap being formed integral with the stud.

The coupling assembly of any preceding clause, the fastening assembly further comprising a nut that is coupled to the stud on a cold side of the stud.

The coupling assembly of any preceding clause, the nut being coupled to the stud by a second threaded connection.

The coupling assembly of any preceding clause, the cap comprising a stud receiving portion that defines a stud opening that receives a portion of the stud.

The coupling assembly of any preceding clause, the stud receiving portion extending from a cold side of an interior surface of the cap and into the hollow interior.

The coupling assembly of any preceding clause, the stud receiving portion being spaced from a hot side of the interior surface of the cap.

The coupling assembly of any preceding clause, the cap further comprising a cap insert positioned in the stud opening.

The coupling assembly of any preceding clause, the stud being coupled to the cap by the cap insert.

The coupling assembly of any preceding clause, the stud being coupled to the cap insert by the first threaded connection.

The coupling assembly of any preceding clause, the cap being press fit onto the cap insert.

The coupling assembly of any preceding clause, the cap insert being formed integrally with the cap.

The coupling assembly of any preceding clause, the stud being press fit onto the cap insert.

The coupling assembly of any preceding clause, the stud being formed integrally with the cap insert.

The coupling assembly of any preceding clause, the stud being brazed or welded to the cap insert.

The coupling assembly of any preceding clause, the washer including a flat portion that contacts the cold side component and a bend portion that contacts the hot side component.

The coupling assembly of any preceding clause, the washer including a washer stud hole for receiving the stud.

The coupling assembly of any preceding clause, the one or more washer cooling holes being disposed in the bend portion of the washer.

The coupling assembly of any preceding clause, the one or more washer cooling holes being disposed within the space between the cold side component and the hot side component.

The coupling assembly of any preceding clause, the cap defining a radial space about the stud receiving portion.

The coupling assembly of any preceding clause, the radial space extending radially from an exterior surface of the stud receiving portion to another portion of the exterior surface of the cap.

The coupling assembly of any preceding clause, the exterior surface defining a generally U-shaped portion that defines the radial space.

The coupling assembly of any preceding clause, the stud receiving portion abutting the washer.

The coupling assembly of any preceding clause, the cap being radially spaced from the washer such that the cooling air is operably directed between the washer and the cap and into the radial space.

The coupling assembly of any preceding clause, the cap further including one or more third cap cooling holes that operably direct the cooling air from the radial space into the hollow interior.

The coupling assembly of any preceding clause, the hot side component including a recessed portion in an area about the fastening mechanism.

The coupling assembly of any preceding clause, the recessed portion being recessed with respect to the hot side of the hot side component.

The coupling assembly of any preceding clause, the recessed portion extending from the hot side component towards the cold side component.

The coupling assembly of any preceding clause, the recessed portion defining a recessed portion space, the cap being disposed in the recessed portion space.

The coupling assembly of any preceding clause, the washer having a diameter greater than a diameter of the recessed portion such that the washer circumferentially surrounds the recessed portion.

The coupling assembly of any preceding clause, the recessed portion including one or more recessed portion cooling holes that operably direct the cooling air from the space to the combustion chamber.

The coupling assembly of any preceding clause, a portion of the cap being spaced from the cold side of the recessed portion such that a space is defined between the cap and the recessed portion.

The coupling assembly of any preceding clause, the cap further including a cap extension that is inserted into a cap receiving portion of the stud.

The coupling assembly of any preceding clause, the recessed portion comprising a stud receiving portion for receiving the stud.

The coupling assembly of any preceding clause, the stud including one or more stud cooling holes that operably direct the cooling from the cold side of the cold side component to the hollow interior of the cap.

The coupling assembly of any preceding clause, the cold side of the cap abutting the hot side of the recessed portion.

The coupling assembly of any preceding clause, the cap being coupled to the stud by the cap extension.

The coupling assembly of any preceding clause, the hot side of the cap being substantially flush with the hot side of the hot side component.

The coupling assembly of any preceding clause, the cap comprising one or more third cap cooling holes that operably direct the cooling air from the one or more stud cooling holes to the hollow interior.

The coupling assembly of any preceding clause, a cold side of the cap being coupled to the stud.

The coupling assembly of any preceding clause, the stud comprising a stud head, the cap being coupled to the stud head.

The coupling assembly of any preceding clause, the cap being coupled to the stud by welding, brazing, or adhesive.

The coupling assembly of any preceding clause, the cap being formed integrally with the stud.

A turbine engine comprises a combustion section including a combustion chamber and a coupling assembly comprising a cold side component, a hot side component, the cold side component and the hot side component together at least partially forming the combustion chamber, and a fastening mechanism coupling the hot side component to the cold side component, the fastening mechanism comprising a stud disposed through the cold side component, and a cap positioned on the stud, the cap defining a hollow interior and including one or more first cap cooling holes that operably direct cooling air into the hollow interior such that the hollow interior provides a cushion of cooling air between the combustion chamber and the stud.

The turbine engine of the preceding clause, the cap being disposed through the hot side component.

The turbine engine of any preceding clause, the cap being positioned between the stud and the combustion chamber.

The turbine engine of any preceding clause, the stud being spaced radially from the combustion chamber such that the stud is insulated from the combustion chamber.

The turbine engine of any preceding clause, cap including one or more second cap cooling holes that operably direct the cooling air from the hollow interior into the combustion chamber.

The turbine engine of any preceding clause, the hollow interior including a diameter that is larger than an outer diameter of the stud.

The turbine engine of c any preceding clause, the cap including a thin wall defined by an interior surface and an exterior surface, the thin wall defining a shape of the hollow interior.

The turbine engine of any preceding clause, the shape of the hollow interior generally corresponding to a shape of the cap.

The turbine engine of any preceding clause, a space being defined between the cold side component and the hot side component, the stud being disposed in the space.

The turbine engine of any preceding clause, further comprising a washer disposed between the cold side component and the hot side component, the washer being flexible such that the hot side component moves with respect to the cold side component and the washer prevents the hot side component from contacting the cold side component.

The turbine engine of any preceding clause, the washer including one or more washer cooling holes that operably direct cooling air towards the cap.

The turbine engine of any preceding clause, the washer including one or more washer slots that extend radially inward from an outer edge of the washer to the one or more cooling holes.

The turbine engine of any preceding clause, the one or more first cap cooling holes operably directing the cooling air from the space to the hollow interior.

The turbine engine of any preceding clause, the one or more cap including an exterior surface and an interior surface, the one or more first cap cooling holes extending through the thin wall from the exterior surface to the interior surface.

The turbine engine of any preceding clause, the cold side component being a shell of a liner of the turbine engine, and the hot side component being a heat shield.

The turbine engine any preceding clause, the cold side component being an annular dome assembly, and the hot side component being a deflector assembly.

The turbine engine of any preceding clause, the cold side component including one or more cold side component cooling holes that operably direct the cooling air from a cold side of the cold side component to the space between the cold side component and the hot side component.

The turbine engine of any preceding clause, the one or more cold side component cooling holes being impingement cooling holes.

The turbine engine of any preceding clause, the hot side component including one or more hot side component cooling holes that operably direct the cooling air from the space to the combustion chamber.

The turbine engine of any preceding clause, the one or more hot side component cooling holes being film cooling holes.

The turbine engine of any preceding clause, the stud being inserted through a first fastening mechanism aperture of the cold side component, and the cap being inserted through a second fastening mechanism aperture of the hot side component.

The turbine engine of any preceding clause, the hot side component including one or more panels that together form the hot side component.

The turbine engine of any preceding clause, each panel of the one or more panels being coupled to the cold side component by one or more fastening mechanisms.

The turbine engine of any preceding clause, the cap being coupled to the stud by a first threaded connection.

The turbine engine of any preceding clause, the cap being press fit onto the stud.

The turbine engine of any preceding clause, the cap being formed integrally with the stud.

The turbine engine of any preceding clause, the fastening assembly further comprising a nut that is coupled to the stud on a cold side of the stud.

The turbine engine of any preceding clause, the nut being coupled to the stud by a second threaded connection.

The turbine engine of any preceding clause, the cap comprising a stud receiving portion that defines a stud opening that receives a portion of the stud.

The turbine engine of any preceding clause, the stud receiving portion extending from a cold side of an interior surface of the cap and into the hollow interior.

The turbine engine of any preceding clause, the stud receiving portion being spaced from a hot side of the interior surface of the cap.

The turbine engine of any preceding clause, the cap further comprising a cap insert positioned in the stud opening.

The turbine engine of any preceding clause, the stud being coupled to the cap by the cap insert.

The turbine engine of any preceding clause, the stud being coupled to the cap insert by the first threaded connection.

The turbine engine of any preceding clause, the cap being press fit onto the cap insert.

The turbine engine of any preceding clause, the cap insert being formed integrally with the cap.

The turbine engine of any preceding clause, the stud being press fit onto the cap insert.

The turbine engine of any preceding clause, the stud being formed integrally with the cap insert.

The turbine engine of any preceding clause, the stud being brazed or welded to the cap insert.

The turbine engine of any preceding clause, the washer including a flat portion that contacts the cold side component and a bend portion that contacts the hot side component.

The turbine engine of any preceding clause, the washer including a washer stud hole for receiving the stud.

The turbine engine of any preceding clause, the one or more washer cooling holes being disposed in the bend portion of the washer.

The turbine engine of any preceding clause, the one or more washer cooling holes being disposed within the space between the cold side component and the hot side component.

The turbine engine of any preceding clause, the cap defining a radial space about the stud receiving portion.

The turbine engine of any preceding clause, the radial space extending radially from an exterior surface of the stud receiving portion to another portion of the exterior surface of the cap.

The turbine engine of any preceding clause, the exterior surface defining a generally U-shaped portion that defines the radial space.

The turbine engine of any preceding clause, the stud receiving portion abutting the washer.

The turbine engine of any preceding clause, the cap being radially spaced from the washer such that the cooling air is operably directed between the washer and the cap and into the radial space.

The turbine engine of any preceding clause, the cap further including one or more third cap cooling holes that operably direct the cooling air from the radial space into the hollow interior.

The turbine engine of any preceding clause, the hot side component including a recessed portion in an area about the fastening mechanism.

The coupling assembly of any preceding clause, the recessed portion being recessed with respect to the hot side of the hot side component.

The turbine engine of any preceding clause, the recessed portion extending from the hot side component towards the cold side component.

The turbine engine of any preceding clause, the recessed portion defining a recessed portion space, the cap being disposed in the recessed portion space.

The turbine engine of any preceding clause, the washer having a diameter greater than a diameter of the recessed portion such that the washer circumferentially surrounds the recessed portion.

The turbine engine of any preceding clause, the recessed portion including one or more recessed portion cooling holes that operably direct the cooling air from the space to the combustion chamber.

The turbine engine of any preceding clause, a portion of the cap being spaced from the cold side of the recessed portion such that a space is defined between the cap and the recessed portion.

The turbine engine of any preceding clause, the cap further including a cap extension that is inserted into a cap receiving portion of the stud.

The turbine engine of any preceding clause, the recessed portion comprising a stud receiving portion for receiving the stud.

The turbine engine of any preceding clause, the stud including one or more stud cooling holes that operably direct the cooling from the cold side of the cold side component to the hollow interior of the cap.

The turbine engine of any preceding clause, the cold side of the cap abutting the hot side of the recessed portion.

The turbine engine of any preceding clause, the cap being coupled to the stud by the cap extension.

The turbine engine of any preceding clause, the hot side of the cap being substantially flush with the hot side of the hot side component.

The turbine engine of any preceding clause, the cap comprising one or more third cap cooling holes that operably direct the cooling air from the one or more stud cooling holes to the hollow interior.

The turbine engine of any preceding clause, a cold side of the cap being coupled to the stud.

The turbine engine of any preceding clause, the stud comprising a stud head, the cap being coupled to the stud head.

The turbine engine of any preceding clause, the cap being coupled to the stud by welding, brazing, or adhesive.

The turbine engine of any preceding clause, the cap being formed integrally with the stud.

A method of operably causing cooling air to flow through a turbine engine. The method comprises operably flowing cooling air through a cold side component of the turbine engine, a hot side component being coupled to the cold side component by a fastening mechanism that comprises a stud disposed through the cold side component and a cap, the cold side component and the hot side component together at least partially forming a combustion chamber. The method comprises operably directing the cooling air through one or more first cap cooling holes in the cap into a hollow interior of the cap such that the hollow interior provides a cushion of cooling air between the combustion chamber and the stud.

The method of the preceding clause, further comprising operably directing the cooling air through the hot side component.

The method of any preceding clause, further comprising operably directing the cooling air through one or more second cap cooling holes from the hollow interior to the combustion chamber.

The method of any preceding clause, further comprising operably directing the cooling air through one or more washer cooling holes of a washer disposed between the cold side component and the hot side component, the washer being flexible such that the hot side component moves with respect to the cold side component and the washer prevents the hot side component from contacting the cold side component.

The method of any preceding clause, further comprising operably directing the cooling air through the one or more washer cooling holes towards the cap.

The method of any preceding clause, further comprising operably directing the cooling air through one or more cold side component cooling holes in the cold side component and into a space defined between the cold side component and the hot side component.

The method of any preceding clause, further comprising operably directing the cooling air from the space to the hollow interior.

The method of any preceding clause, further comprising operably directing the cooling air through one or more hot side component cooling holes in the hot side component and into the combustion chamber.

The method of any preceding clause, further comprising operably directing the cooling air into a radial space between the washer and the cap.

The method of any preceding clause, further comprising operably directing the cooling air from the radial space into the hollow interior through one or more third cap cooling holes.

The method of any preceding clause, the hot side component including a recessed portion, the method further comprising operably directing the cooling air through one or more recessed portion cooling holes in the recessed portion from the space to the combustion chamber.

The method of any preceding clause, the cap being disposed in a recessed portion space defined by the recessed portion, the method further comprising operably directing the cooling air from the recessed portion space through the one or more first cap cooling holes and into the hollow interior of the cap.

The method of any preceding clause, the stud comprising one or more stud cooling holes, the method further comprising operably directing the cooling air from the cold side of the cold side component through the one or more stud cooling holes.

The method of any preceding clause, the cap further comprising one or more third cap cooling holes, the method further comprising operably directing the cooling air from the one or more stud cooling holes through the one or more third cap cooling holes and into the hollow interior.

The method of any preceding clause, further comprising operably directing the cooling air through the washer and into a space between the washer and the cap.

The method of any preceding clause, further comprising operably directing the cooling air through the washer and into a space between the washer and the recessed portion.

The method of any preceding clause, further comprising film cooling the cap by operably directing the cooling air from the hollow interior through the one or more second cap cooling holes and into the combustion chamber.

The method of any preceding clause, further comprising impingement cooling the hot side component by operably directing the cooling air from the cold side of the cold side component through the one or more cold side component cooling holes and into the space between the cold side component and the hot side component.

The method of any preceding clause, the cooling air being compressed air from a compressor section of the turbine engine.

The method of any preceding clause, the cold side component being a shell of a liner of the turbine engine, and the hot side component being a heat shield.

The method of any preceding clause, the cold side component being an annular dome assembly, and the hot side component being a deflector assembly.

A coupling assembly for a turbine engine comprises a cold side component, a hot side component, the cold side component and the hot side component together at least partially forming a combustion chamber, a plurality of fastening mechanisms disposed through the cold side component, and a plurality of flexible plates, each of the plurality of flexible plates being circumferentially spaced from each other and extending from a respective one of the plurality of fastening mechanisms to the hot side component and engaging the hot side component to couple the hot side component to the cold side component such that the plurality of fastening mechanisms are insulated from the combustion chamber.

The coupling assembly of the preceding clause, each of the plurality of flexible plates including one or more flexible plate cooling holes that operably direct cooling air through the plurality of flexible plates.

The coupling assembly of any preceding clause, the plurality of fastening mechanisms comprising a first fastening mechanism and a second fastening mechanism, and the plurality of flexible plates comprise a first flexible plate extending from the first fastening mechanism to the hot side component and a second flexible plate extending from the second fastening mechanism to the hot side component.

The coupling assembly of any preceding clause, the first fastening mechanism being located upstream of the second fastening mechanism.

The coupling assembly of any preceding clause, the first flexible plate extending from the first fastening mechanism downstream and to the hot side component.

The coupling assembly of any preceding clause, the second flexible plate extending from the second fastening mechanism upstream and to the hot side component.

The coupling assembly of any preceding clause, the hot side component comprising a plurality of flanges, each of the plurality of flexible plates engaging a respective one of the plurality of flanges to couple the hot side component to the cold side component.

The coupling assembly of any preceding clause, each of the plurality of flanges comprising a radial flange portion extending substantially radially from the hot side component and an axial flange portion extending substantially axially from the radial flange portion.

The coupling assembly of any preceding clause, each of the plurality of flexible plates engaging a respective axial flange portion.

The coupling assembly of any preceding clause, the plurality of flanges comprising a first flange and a second flange positioned downstream of the first flange, and the plurality of flexible plates comprise a first flexible plate and a second flexible plate, the first flexible plate engaging the second flange and the second flexible plate engaging the first flange.

The coupling assembly of any preceding clause, further comprising a space defined between the first flange and the second flange, each of the plurality of flexible plates extending into the space to couple the hot side component to the cold side component.

The coupling assembly of any preceding clause, the first flange comprising a first radial flange portion and a first axial flange portion, the first axial flange portion extending axially downstream from the first radial flange portion.

The coupling assembly of any preceding clause, the second flange comprising a second radial flange portion and a second axial flange portion, the second axial flange portion extending axially upstream from the second radial flange portion.

The coupling assembly of any preceding clause, the hot side component comprising one or more panels, the one or more panels being coupled to the cold side component by the plurality of flexible plates.

The coupling assembly of any preceding clause, the plurality of flexible plates each comprising a fastening mechanism aperture for receiving a respective fastening mechanism of the one or more fastening mechanisms.

The coupling assembly of any preceding clause, the plurality of flexible plates each comprising a fastening coupling portion that is coupled to a respective fastening mechanism of the one or more fastening mechanisms and a flange coupling portion that is coupled to a respective flange of the plurality of flanges.

The coupling assembly of any preceding clause, the flange coupling portion comprising one or more first projections and one or more second projections that are separated at the flange coupling portion, the one or more first projections and the one or more second projections engaging with a respective flange of the plurality of flanges.

The coupling assembly of any preceding clause, the one or more first projections engaging a hot side of the respective flange, and the one or more second projections engaging a cold side of the respective flange.

The coupling assembly of any preceding clause, the respective flange being press fit between the one or more first projections and the one or more second projections.

The coupling assembly of any preceding clause, the plurality of flexible plates each comprising a first bend defined at the fastening mechanism coupling portion such that the plurality of flexible plates extend radially inward from the fastening mechanism coupling portion.

The coupling assembly of any preceding clause, the plurality of flexible plates each comprising one or more second bends defined at the flange coupling portion, the one or more first projections and the one or more second projections being bent at the one or more second bends.

The coupling assembly of any preceding clause, the one or more first projections being bent radially outwardly at the one or more second bends, and the one or more second projections being bent radially inwardly at the one or more second bends.

The coupling assembly of any preceding clause, the one or more first projections and the one or more second projections being split into different directions at the one or more second bends.

The coupling assembly of any preceding clause, the plurality of flexible plates each comprising one or more third bends at the one or more first projections and the one or more second projections.

The coupling assembly of any preceding clause, the one or more first projections being bent radially inwardly at the one or more third bends, and the one or more second projections being bent radially outwardly at the one or more third bends.

The coupling assembly of any preceding clause, the plurality of flexible plates each comprising one or more fourth bends at the one or more first projections and the one or more second projections.

The coupling assembly of any preceding clause, the one or more first projections being bent radially outwardly at the one or more fourth bends, and the one or more second projections being bent radially inwardly at the one or more fourth bends.

The coupling assembly of any preceding clause, the one or more first projections and the one or more second projections engaging the axial flange portion at the one or more fourth bends.

The coupling assembly of any preceding clause, the plurality of flexible plates each comprising a first fastening mechanism aperture and a second fastening mechanism aperture.

The coupling assembly of any preceding clause, the first fastening mechanism aperture being located at the fastening mechanism coupling portion, and the second fastening mechanism aperture being located at the flange coupling portion.

The coupling assembly of any preceding clause, the flange coupling portion engaging a cold side of the axial flange portion.

The coupling assembly of any preceding clause, the plurality of flexible plates each including a first bend at the fastening mechanism coupling portion and a second bend at the flange coupling portion.

The coupling assembly of any preceding clause, the flange coupling portion holding the hot side component at the axial flange portion.

The coupling assembly of any preceding clause, the flange coupling portion being secured to the axial flange portion by at least one of brazing, welding, or adhesive.

The coupling assembly of any preceding clause, the plurality of flexible plates being flexible in multiple degrees of freedom such that the hot side component moves axially, radially, or circumferentially with respect to the cold side component.

The coupling assembly of any preceding clause, the first flexible plate being positioned circumferentially adjacent the second flexible plate.

The coupling assembly of any preceding clause, the first flexible plate being positioned circumferentially aft with respect to the second flexible plate.

The coupling assembly of any preceding clause, a space being defined between the cold side component and the hot side component, the plurality of plates being disposed in the space.

The coupling assembly of any preceding clause, the one or more fastening mechanisms being disposed in the space between the cold side component and the hot side component.

The coupling assembly of any preceding clause, the one or more fastening mechanisms comprising a stud and a stud head, the stud head being disposed on a hot side of the cold side component.

The coupling assembly of any preceding clause, the stud head being disposed in the space between the cold side component and the hot side component.

The coupling assembly of any preceding clause, the cold side component being a shell of a liner of the turbine engine, and the hot side component being a heat shield.

The coupling assembly any preceding clause, the cold side component being an annular dome assembly, and the hot side component being a deflector assembly.

The coupling assembly of any preceding clause, the cold side component including one or more cold side component cooling holes that operably direct the cooling air from a cold side of the cold side component to the space between the cold side component and the hot side component.

The coupling assembly of any preceding clause, the one or more cold side component cooling holes being impingement cooling holes.

The coupling assembly of any preceding clause, the hot side component including one or more hot side component cooling holes that operably direct the cooling air from the space to the combustion chamber.

The coupling assembly of any preceding clause, the one or more hot side component cooling holes being film cooling holes.

The coupling assembly of any preceding clause, the one or more fastening mechanisms each comprising a stud extending through the cold side component.

The coupling assembly of any preceding clause, the fastening assembly further comprising a nut that is coupled to the stud on a cold side of the stud.

The coupling assembly of any preceding clause, the nut being coupled to the stud by a second threaded connection.

A turbine engine comprises a combustion section including a combustion chamber and a coupling assembly comprising, a cold side component, a hot side component, the cold side component and the hot side component together at least partially forming a combustion chamber, a plurality of fastening mechanisms disposed through the cold side component, and a plurality of flexible plates, each of the plurality of flexible plates being circumferentially spaced from each other and extending from a respective one of the plurality of fastening mechanisms to the hot side component and engaging the hot side component to couple the hot side component to the cold side component such that the plurality of fastening mechanisms are insulated from the combustion chamber.

The turbine engine of any preceding clause, each of the plurality of flexible plates including one or more flexible plate cooling holes that operably direct cooling air through the plurality of flexible plates.

The turbine engine of any preceding clause, the hot side component comprising a plurality of flanges, each of the plurality of flexible plates engaging a respective one of the plurality of flanges to couple the hot side component to the cold side component.

The turbine engine of any preceding clause, the plurality of fastening mechanisms comprising a first fastening mechanism and a second fastening mechanism, and the plurality of flexible plates comprise a first flexible plate extending from the first fastening mechanism to the hot side component and a second flexible plate extending from the second fastening mechanism to the hot side component.

The turbine engine of any preceding clause, the first fastening mechanism being located upstream of the second fastening mechanism.

The turbine engine of any preceding clause, the first flexible plate extending from the first fastening mechanism downstream and to the hot side component.

The turbine engine of any preceding clause, the second flexible plate extending from the second fastening mechanism upstream and to the hot side component.

The turbine engine of any preceding clause, the hot side component comprising a plurality of flanges, the plurality of flexible plates engaging the plurality of flanges to couple the hot side component to the cold side component.

The turbine engine of any preceding clause, the plurality of flanges comprising a first flange and a second flange positioned downstream of the first flange, the first flexible plate engaging the second flange and the second flexible plate engaging the first flange.

The turbine engine of any preceding clause, the plurality of flanges each including a radial flange portion extending substantially radially from the hot side component and an axial flange portion extending substantially axially from the radial flange portion.

The turbine engine of any preceding clause, the plurality of flexible plates engaging the axial flange portion.

The turbine engine of any preceding clause, the first flange including a first radial flange portion and a first axial flange portion, the first axial flange portion extending axially downstream from the first radial flange portion.

The turbine engine of any preceding clause, the second flange including a second radial flange portion and a second axial flange portion, the second axial flange portion extending axially upstream from the second radial flange portion.

The turbine engine of any preceding clause, further comprising a space defined between the first flange and the second flange, the plurality of flexible plates extending into the space.

The turbine engine of any preceding clause, the hot side component comprising one or more panels, the one or more panels being coupled to the cold side component by the plurality of flexible plates.

The turbine engine of any preceding clause, the plurality of flexible plates each comprising a fastening mechanism aperture for receiving a respective fastening mechanism of the one or more fastening mechanisms.

The turbine engine of any preceding clause, the plurality of flexible plates each comprising a fastening coupling portion that is coupled to a respective fastening mechanism of the one or more fastening mechanisms and a flange coupling portion that is coupled to a respective flange of the plurality of flanges.

The turbine engine of any preceding clause, the flange coupling portion comprising one or more first projections and one or more second projections that are separated at the flange coupling portion, the one or more first projections and the one or more second projections engaging with a respective flange of the plurality of flanges.

The turbine engine of any preceding clause, the one or more first projections engaging a hot side of the respective flange, and the one or more second projections engaging a cold side of the respective flange.

The turbine engine of any preceding clause, the respective flange being press fit between the one or more first projections and the one or more second projections.

The turbine engine of any preceding clause, the plurality of flexible plates each comprising a first bend defined at the fastening mechanism coupling portion such that the plurality of flexible plates extend radially inward from the fastening mechanism coupling portion.

The turbine engine of any preceding clause, the plurality of flexible plates each comprising one or more second bends defined at the flange coupling portion, the one or more first projections and the one or more second projections being bent at the one or more second bends.

The turbine engine of any preceding clause, the one or more first projections being bent radially outwardly at the one or more second bends, and the one or more second projections being bent radially inwardly at the one or more second bends.

The turbine engine of any preceding clause, the one or more first projections and the one or more second projections being split into different directions at the one or more second bends.

The turbine engine of any preceding clause, the plurality of flexible plates each comprising one or more third bends at the one or more first projections and the one or more second projections.

The turbine engine of any preceding clause, the one or more first projections being bent radially inwardly at the one or more third bends, and the one or more second projections being bent radially outwardly at the one or more third bends.

The turbine engine of any preceding clause, the plurality of flexible plates each comprising one or more fourth bends at the one or more first projections and the one or more second projections.

The turbine engine of any preceding clause, the one or more first projections being bent radially outwardly at the one or more fourth bends, and the one or more second projections being bent radially inwardly at the one or more fourth bends.

The turbine engine of any preceding clause, the one or more first projections and the one or more second projections engaging the axial flange portion at the one or more fourth bends.

The turbine engine of any preceding clause, the plurality of flexible plates each comprising a first fastening mechanism aperture and a second fastening mechanism aperture.

The turbine engine of any preceding clause, the first fastening mechanism aperture being located at the fastening mechanism coupling portion, and the second fastening mechanism aperture being located at the flange coupling portion.

The turbine engine of any preceding clause, the flange coupling portion engaging a cold side of the axial flange portion.

The turbine engine of any preceding clause, the plurality of flexible plates each including a first bend at the fastening mechanism coupling portion and a second bend at the flange coupling portion.

The turbine engine of any preceding clause, the flange coupling portion holding the hot side component at the axial flange portion.

The turbine engine of any preceding clause, the flange coupling portion being secured to the axial flange portion by at least one of brazing, welding, or adhesive.

The turbine engine of any preceding clause, the plurality of flexible plates being flexible in multiple degrees of freedom such that the hot side component moves axially, radially, or circumferentially with respect to the cold side component.

The turbine engine of any preceding clause, the first flexible plate being positioned circumferentially adjacent the second flexible plate.

The turbine engine of any preceding clause, the first flexible plate being positioned circumferentially aft with respect to the second flexible plate.

The turbine engine of any preceding clause, a space being defined between the cold side component and the hot side component, the plurality of plates being disposed in the space.

The turbine engine of any preceding clause, the one or more fastening mechanisms being disposed in the space between the cold side component and the hot side component.

The turbine engine of any preceding clause, the one or more fastening mechanisms comprising a stud and a stud head, the stud head being disposed on a hot side of the cold side component.

The turbine engine of any preceding clause, the stud head being disposed in the space between the cold side component and the hot side component.

The turbine engine of any preceding clause, the cold side component being a shell of a liner of the turbine engine, and the hot side component being a heat shield.

The turbine engine any preceding clause, the cold side component being an annular dome assembly, and the hot side component being a deflector assembly.

The turbine engine of any preceding clause, the cold side component including one or more cold side component cooling holes that operably direct the cooling air from a cold side of the cold side component to the space between the cold side component and the hot side component.

The turbine engine of any preceding clause, the one or more cold side component cooling holes being impingement cooling holes.

The turbine engine of any preceding clause, the hot side component including one or more hot side component cooling holes that operably direct the cooling air from the space to the combustion chamber.

The turbine engine of any preceding clause, the one or more hot side component cooling holes being film cooling holes.

The turbine engine of any preceding clause, the one or more fastening mechanisms each comprising a stud extending through the cold side component.

The turbine engine of any preceding clause, the fastening assembly further comprising a nut that is coupled to the stud on a cold side of the stud.

The turbine engine of any preceding clause, the nut being coupled to the stud by a second threaded connection.

A method of operably causing cooling air to flow through a turbine engine. The method comprises operably causing cooling air to flow through a cold side component of the turbine engine, a hot side component being coupled to the cold side component by a plurality of fastening mechanisms, the cold side component and the hot side component together at least partially forming a combustion chamber. The method comprises operably directing the cooling air through one or more flexible plate cooling holes of a plurality of flexible plates, the plurality of flexible plates each being circumferentially spaced from each other and extending a respective one of the plurality of fastening mechanisms to the hot side component and engaging the hot side component to couple the hot side component to the cold side component such that the plurality of fastening mechanisms are insulated from the combustion chamber.

The method of the preceding clause, further comprising operably directing the cooling air through the hot side component.

The method of any preceding clause, further comprising operably directing the cooling air through one or more cold side component cooling holes in the cold side component and into a space defined between the cold side component and the hot side component.

The method of any preceding clause, further comprising operably directing the cooling air from the space through the one or more flexible plate cooling holes of the plurality of flexible plates.

The method of any preceding clause, further comprising operably directing the cooling air between the plurality of flexible plates and the hot side component.

The method of any preceding clause, further comprising operably directing the cooling air through one or more hot side component cooling holes in the hot side component and into the combustion chamber.

The method of any preceding clause, further comprising film cooling the cap by operably directing the cooling air from the hollow interior through the one or more second cap cooling holes and into the combustion chamber.

The method of any preceding clause, further comprising impingement cooling the hot side component by operably directing the cooling air from the cold side of the cold side component through the one or more cold side component cooling holes and into the space between the cold side component and the hot side component.

The method of any preceding clause, the cooling air being compressed air from a compressor section of the turbine engine.

The method of any preceding clause, the cold side component being a shell of a liner of the turbine engine, and the hot side component being a heat shield.

The method of any preceding clause, the cold side component being an annular dome assembly, and the hot side component being a deflector assembly.

The method of any preceding clause, the plurality of flexible plates comprising a first flexible plate and a second flexible plate, the method comprising operably directing cooling air through the first flexible plate and the second flexible plate.

The method of any preceding clause, the plurality of fastening mechanisms comprising a first fastening mechanism and a second fastening mechanism, the plurality of flexible plates comprising a first flexible plate extending from the first fastening mechanism to the hot side component and a second flexible plate extending from the second fastening mechanism to the hot side component.

The method of any preceding clause, the first fastening mechanism being located upstream of the second fastening mechanism.

The method of any preceding clause, the first flexible plate extending from the first fastening mechanism downstream and to the hot side component.

The method of any preceding clause, the second flexible plate extending from the second fastening mechanism upstream and to the hot side component.

The method of any preceding clause, the hot side component comprising a plurality of flanges, the plurality of flexible plates engaging the plurality of flanges to couple the hot side component to the cold side component.

The method of any preceding clause, the plurality of flanges comprising a first flange and a second flange positioned downstream of the first flange, the first flexible plate engaging the second flange and the second flexible plate engaging the first flange.

Although the foregoing description is directed to the preferred embodiments of the present disclosure, other variations and modifications will be apparent to those skilled in the art and may be made without departing from the spirit or the scope of the disclosure. Moreover, features described in connection with one embodiment of the present disclosure may be used in conjunction with other embodiments, even if not explicitly stated above.

The invention claimed is:

1. A coupling assembly for a turbine engine, the coupling assembly comprising:
   a cold side component having a first fastening mechanism aperture disposed therethrough;
   a hot side component, the cold side component and the hot side component together at least partially forming a combustion chamber, wherein the hot side component has a second fastening mechanism aperture disposed therethrough; and
   a fastening mechanism coupling the hot side component to the cold side component, the fastening mechanism comprising:
      a stud disposed through the first fastening mechanism aperture of the cold side component; and
      a cap positioned on the stud and within the second fastening mechanism aperture of the hot side component, the cap defining a hollow interior and including one or more first cap cooling holes that operably direct cooling air into the hollow interior such that the hollow interior provides a cushion of cooling air between the combustion chamber and the stud, wherein a portion of the stud is disposed within the hollow interior such that the hollow interior surrounds the stud.

2. The coupling assembly of claim 1, wherein a space is defined between the cold side component and the hot side component, the stud being disposed in the space.

3. The coupling assembly of claim 1, wherein the cap is disposed through the hot side component.

4. The coupling assembly of claim 1, wherein the cap is positioned between the stud and the combustion chamber.

5. The coupling assembly of claim 1, wherein the stud is radially spaced from the combustion chamber such that the stud is insulated from the combustion chamber.

6. The coupling assembly of claim 1, wherein the cap includes one or more second cap cooling holes that operably direct the cooling air from the hollow interior into the combustion chamber.

7. The coupling assembly of claim 1, wherein the hollow interior includes a diameter that is larger than an outer diameter of the stud.

8. The coupling assembly of claim 1, wherein a shape of the hollow interior generally corresponds to a shape of the cap.

9. The coupling assembly of claim 1, further comprising a washer disposed between the cold side component and the hot side component, the washer being flexible such that the hot side component moves with respect to the cold side component and the washer prevents the hot side component from contacting the cold side component.

10. The coupling assembly of claim 9, wherein the washer includes one or more washer cooling holes that operably direct cooling air towards the cap.

11. The coupling assembly of claim 10, wherein the washer includes one or more washer slots that extend radially inward from an outer edge of the washer to the one or more washer cooling holes.

12. The coupling assembly of claim 1, wherein the cap has a generally frustoconical shape having an angled side wall.

13. The coupling assembly of claim 12, wherein the one or more first cap cooling holes extend through the angled side wall and are in fluid communication with a space defined between the cold side component and the hot side component, the one or more first cap cooling holes operably directing the cooling air from the space into the hollow interior.

14. A turbine engine comprising:
   a combustion section including a combustion chamber; and
   a coupling assembly comprising:
      a cold side component having a first fastening mechanism aperture disposed therethrough;
      a hot side component, the cold side component and the hot side component together at least partially forming the combustion chamber, wherein the hot side component has a second fastening mechanism aperture disposed therethrough; and
      a fastening mechanism coupling the hot side component to the cold side component, the fastening mechanism comprising:
         a stud disposed through the first fastening mechanism aperture of the cold side component; and
         a cap positioned on the stud and within the second fastening mechanism aperture of the hot side component, the cap defining a hollow interior and including one or more first cap cooling holes that operably direct cooling air into the hollow interior such that the hollow interior provides a cushion of cooling air between the combustion chamber and the stud, wherein a portion of the stud is disposed within the hollow interior such that the hollow interior surrounds the stud.

15. The turbine engine of claim 14, wherein the cap is disposed through the hot side component.

16. The turbine engine of claim 14, wherein the cap is positioned between the stud and the combustion chamber.

17. The turbine engine of claim 14, wherein the stud is spaced radially from the combustion chamber such that the stud is insulated from the combustion chamber.

18. The turbine engine of claim 14, wherein the cap includes one or more second cap cooling holes that operably direct the cooling air from the hollow interior into the combustion chamber.

19. The turbine engine of claim 14, wherein the hollow interior includes a diameter that is larger than an outer diameter of the stud.

20. The turbine engine of claim 14, wherein a shape of the hollow interior generally corresponds to a shape of the cap.

* * * * *